(12) United States Patent
Tabuchi et al.

(10) Patent No.: US 11,417,881 B2
(45) Date of Patent: Aug. 16, 2022

(54) LITHIUM-MANGANESE COMPLEX OXIDE AND METHOD FOR PRODUCING SAME

(71) Applicants: National Institute of Advanced Industrial Science and Technology, Tokyo (JP); Tanaka Chemical Corporation, Fukui (JP); NEC Corporation, Tokyo (JP)

(72) Inventors: Mitsuharu Tabuchi, Osaka (JP); Hideka Shibuya, Fukui (JP); Takashi Ohtomo, Fukui (JP); Noriyuki Tamura, Tokyo (JP); Kaoru Narita, Tokyo (JP); Ryota Yuge, Tokyo (JP); Naoki Kawano, Tokyo (JP)

(73) Assignees: National Institute ot Advanced Industrial Science and Technology, Tokyo (JP); Tanaka Chemical Corporation, Fukui (JP); NEC Corporation, Tokyo (JP)

( * ) Notice: Subject to any disclaimer, the term of this patent is extended or adjusted under 35 U.S.C. 154(b) by 246 days.

(21) Appl. No.: 16/462,116

(22) PCT Filed: Nov. 14, 2017

(86) PCT No.: PCT/JP2017/040861
§ 371 (c)(1),
(2) Date: May 17, 2019

(87) PCT Pub. No.: WO2018/096972
PCT Pub. Date: May 31, 2018

(65) Prior Publication Data
US 2019/0334169 A1    Oct. 31, 2019

(30) Foreign Application Priority Data

Nov. 22, 2016   (JP) .............................. JP2016-226584

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ..................................................... C01G 53/50
See application file for complete search history.

(56) References Cited

U.S. PATENT DOCUMENTS

2002/0045098 A1   4/2002  Tabuchi et al.
2006/0188780 A1   8/2006  Fujii et al.

FOREIGN PATENT DOCUMENTS

JP      2002/068748 A    3/2002
JP      2008/127211 A    6/2008
(Continued)

OTHER PUBLICATIONS

Hisanaga et al "Magnetic Properties of Li—Ni—Mn Layered Rock-Salt Oxides" Journal of the Magnetics Society of Japan vol. 33, pp. 441-446, 2009.
(Continued)

*Primary Examiner* — Peter F Godenschwager
(74) *Attorney, Agent, or Firm* — Cesari & McKenna, LLP

(57) ABSTRACT

A lithium-manganese composite oxide represented by formula (1): $Li_{1+x}[(Fe_yNi_{1-y})_zMn_{1-z}]_{1-x}O_2$ (1) wherein x, y, and z satisfy the following: $0<x\leq1/3$, $0\leq y<1.0$, and $0<z\leq0.6$, and wherein the content ratio of Li to the total content of Fe, Ni, and Mn (Li/(Fe+Ni+Mn)) is 1.55 or less on a molar ratio basis, the lithium-manganese composite oxide containing a crystalline phase having a layered rock-salt structure. This composite oxide is a novel material made from less
(Continued)

resource-constrained and cheaper elements, and exhibits a high specific capacity, excellent charge-and-discharge cycle characteristics, and a high discharge capacity at a high current density (excellent rate characteristics), when used in the positive electrode material for lithium-ion secondary batteries.

17 Claims, 11 Drawing Sheets

(51) Int. Cl.
    *H01M 4/505*     (2010.01)
    *H01M 10/0525*     (2010.01)
    *H01M 4/02*     (2006.01)

(52) U.S. Cl.
    CPC ..... *H01M 10/0525* (2013.01); *C01P 2002/22* (2013.01); *C01P 2002/50* (2013.01); *C01P 2002/72* (2013.01); *C01P 2006/12* (2013.01); *C01P 2006/42* (2013.01); *H01M 2004/028* (2013.01)

(56) References Cited

FOREIGN PATENT DOCUMENTS

JP     2015/041583 A     3/2015
WO     WO-2005/007577 A1     1/2005

OTHER PUBLICATIONS

Tabuchi et al "Synthesis and Electrochemical Characterization of Fe and Ni Substituted $Li_2MnO_3$—An Effective Means to Use Fe for Constructing "Co-Free" $Li_2MnO_3$ Based Positive Electrode Material" Journal of Power Sources vol. 196, pp. 3611-3622, 2011.

LITHIUM-MANGANESE COMPLEX OXIDE AND METHOD FOR PRODUCING SAME

CROSS-REFERENCE TO RELATED APPLICATIONS

This application is the National Stage of International Application No. PCT/JP2017/040861, filed Nov. 14, 2017, which claims the benefit of priority of Japanese Patent Application No. 2016-226,584, filed Nov. 22, 2016, the contents of both being incorporated by reference in their entirety for all purposes.

TECHNICAL FIELD

The present invention relates to a lithium-manganese composite oxide, and a method for producing the composite oxide.

BACKGROUND ART

Currently in Japan, most of the secondary batteries used in portable devices, such as cellular phones, smartphones, laptop computers, and tablet computers, are lithium-ion secondary batteries. Lithium-ion secondary batteries are expected to become more commercially viable, for example, in large-scale batteries, such as for vehicle applications (e.g., electric vehicles and plug-in hybrid vehicles) and load-leveling systems (e.g., solar batteries and wind power generation), thus increasing their importance.

The positive electrode material for use in current lithium-ion secondary batteries is a lithium-containing transition metal oxide, such as lithium cobalt oxide ($LiCoO_2$), lithium nickel oxide ($LiNiO_2$), and lithium manganate ($LiMn_2O_4$); and the anode material is for use is graphite, lithium titanate, silicon oxide, etc. In particular, the amount of lithium-ions that reversibly undergoes extraction (charging) and insertion (discharging) in a positive electrode material determines the capacity of a battery, and the voltage during extraction and insertion determines the operating voltage of a battery. In other words, the capacity and operation voltage of a battery are determined by the positive electrode. Additionally, the positive electrode active material is the most costly component, accounting for several tens of percent of the cost of battery component materials; thus, the selection of a positive electrode material is the most important in the development of lithium-ion secondary batteries.

With the trend toward a wider range of applications and a larger scale of lithium-ion secondary batteries, the industry expects further increases in demand for positive electrode materials. However, lithium cobalt oxide, typically used in positive electrode materials, contains a large amount of cobalt (a rare metal), thus contributing to the rising material cost of lithium-ion secondary batteries. Moreover, given the fact that about 20% of the cobalt resource is currently used in the battery industry, it will be difficult to address the expanding demand in the future with positive electrode materials composed of $LiCoO_2$ alone. Thus, oxide positive electrode materials made from abundant elements are desired, in particular, for use in large-scale lithium-ion secondary batteries for automobile applications, for example.

The present inventors found, regarding cheaper and non-resource-constrained positive electrode materials, that a solid solution that contains lithium manganese oxide ($Li_2MnO_3$) and lithium ferrite, and that has a layered rock-salt structure ($Li_{1+x}(Fe_yMn_{1-y})_{1-x}O_2$ ($0<x<\frac{1}{3}$, $0<y<1$), which may be called "iron-containing $Li_2MnO_3$" below), exhibits an average discharge voltage of close to 4V, substantially equivalent to that of lithium cobalt oxide, in a charge-and-discharge test at room temperature (see, for example, PTL 1). The inventors also found that a lithium-iron-manganese-based composite oxide of a predetermined composition exhibits stable and excellent charge-and-discharge characteristics that are even greater than those of existing positive electrode materials (see, for example, PTL 2).

As noted above, there have been many reports on lithium manganese-based positive electrode materials that may become an alternative for lithium-cobalt-based positive electrode materials. However, far greater optimization of chemical compositions and production conditions for positive electrode materials are necessary to further improve charge-and-discharge characteristics.

CITATION LIST

Patent Literature

PTL 1: JP2002-068748A
PTL 2: JP2008-127211A

SUMMARY OF INVENTION

Technical Problem

The present invention was made in view of the current state of the art, and a major object of the invention is to provide a novel material that is made from less resource-constrained and cheaper elements, and that has a high specific capacity, excellent charge-and-discharge cycle characteristics, and a high discharge capacity at a high current density (excellent in rate characteristics), when used in a positive electrode material for lithium-ion secondary batteries.

Solution to Problem

The present inventors conducted extensive research to achieve the object, and found that when the content ratio of Li to the total content of Fe, Ni, and Mn (Li/(Fe+Ni+Mn)) in a $Li_2MnO_3$ composite oxide containing a specific amount of iron and/or nickel falls within a specific range, the composite made from less resource-constrained and cheaper elements exhibits a high specific capacity, excellent charge-and-discharge cycle characteristics, and a high discharge capacity at a high current density (excellent in rate characteristics), when used in a positive electrode material for lithium-ion secondary batteries. The inventors conducted further research on the basis of these findings, and complete the present invention. Specifically, the present invention includes the following subject matter.

Item 1. A lithium-manganese composite oxide represented by formula (1): $Li_{1+x}[(Fe_yNi_{1-y})_zMn_{1-z}]_{1-x}O_2$ (1)

wherein x, y, and z satisfy the following: $0<x\leq\frac{1}{3}$, $0\leq y<1.0$, and $0<z\leq0.6$, and wherein the content ratio of Li to the total content of Fe, Ni, and Mn (Li/(Fe+Ni+Mn)) is 1.55 or less on a molar ratio basis, the lithium-manganese composite oxide comprising a crystalline phase having a layered rock-salt structure.

Item 2. The lithium-manganese composite oxide according to item 1, consisting of the crystalline phase having a layered rock-salt structure.

Item 3. The lithium-manganese composite oxide according to item 1 or 2, wherein the lithium-manganese composite oxide has a spontaneous magnetization (Ms) of 0.0070 emu/g or less (0.0070 A·m$^2$/kg or less).

Item 4. The lithium-manganese composite oxide according to any one of items 1 to 3, wherein the content ratio of O to the total content of Fe, Ni, and Mn (O/(Fe+Ni+Mn)) is 2.48 or less on a molar ratio basis.

Item 5. The lithium-manganese composite oxide according to any one of items 1 to 4, wherein z≤0.25, and the lithium-manganese composite oxide has a BET specific surface area of 12.0 m$^2$/g or less.

Item 6. The lithium-manganese composite oxide according to item 5, wherein the total transition metal content per compositional formula ($g_{total}$) is 0.700 or more.

Item 7. The lithium-manganese composite oxide according to item 5 or 6, wherein the average transition metal content in a Li layer ($g_{MLi}$) is 0.010 or more.

Item 8. The lithium-manganese composite oxide according to any one of items 1 to 4, wherein z>0.25, and the lithium-manganese composite oxide has a BET specific surface area of 16.0 m$^2$/g or less.

Item 9. The lithium-manganese composite oxide according to item 8, wherein the total transition metal content per compositional formula ($g_{total}$) is 0.740 or more.

Item 10. The lithium-manganese composite oxide according to item 8 or 9, wherein the average transition metal content in a Li layer ($g_{MLi}$) is 0.025 or more.

Item 11. A method for producing the lithium-manganese composite oxide of any one of items 1 to 10, the method comprising in the following sequence the steps of:

(1) making a mixture of a manganese compound and at least one compound selected from the group consisting of a nickel compound and an iron compound into an alkaline mixture to form a precipitate, (2) subjecting the precipitate obtained in step (1) to wet oxidation treatment to allow the precipitate to age, (3) heating the aged precipitate obtained in step (2) together with a lithium compound, and (4) heating a mixture obtained in step (3) in the presence of an organic reducing agent in an inert atmosphere or in a reducing atmosphere.

Item 12. A positive electrode material for lithium-ion secondary batteries, comprising the lithium-manganese composite oxide of any one of items 1 to 10.

Item 13. A lithium-ion secondary battery comprising the positive electrode material for lithium-ion secondary batteries of item 12.

Advantageous Effects of Invention

The present invention provides a novel material that is made from less resource-constrained and cheaper elements, and that has a high specific capacity, excellent charge-and-discharge cycle characteristics, and a high discharge capacity at a high current density (excellent in rate characteristics), when used in a positive electrode material for lithium-ion secondary batteries.

DESCRIPTION OF EMBODIMENTS

1. Lithium-Manganese Composite Oxide

Figure 1:
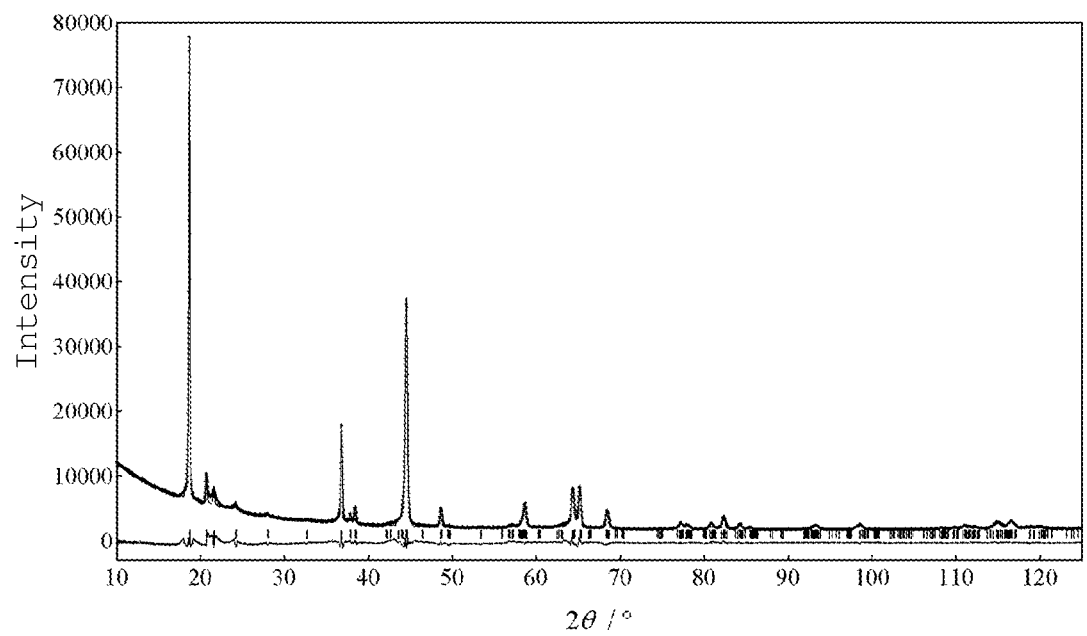
FIG. 1 illustrates X-ray diffraction patterns of a specimen obtained in Example 1: an actually measured pattern (+), and a calculated pattern (solid line).

The lithium-manganese composite oxide according to the present invention is represented by formula (1): $Li_{1+x}[(Fe_yNi_{1-y})_zMn_{1-z}]_{1-x}O_2$ (1)

wherein x, y, and z satisfy the following: $0<x\leq 1/3$, $0\leq y<1.0$, and $0\leq z<0.6$, and wherein the content ratio of Li to the total content of Fe, Ni, and Mn (Li/(Fe+Ni+Mn)) is 1.55 or less on a molar ratio basis, the lithium-manganese composite oxide comprising a crystalline phase having a layered rock-salt structure.

The contained crystalline phase having a layered rock-salt structure may be either a crystalline phase having a monoclinic layered rock-salt structure, or a crystalline phase having a hexagonal layered rock-salt structure. The production method described later is likely to produce a crystalline phase having a monoclinic layered rock-salt structure.

The monoclinic layered rock-salt structure is a crystalline phase that can be assigned to the following space group.

C2/m

Specifically, from the standpoint of capacity and cycle characteristics, the crystalline phase preferably has a $Li_2MnO_3$ monoclinic layered rock-salt structure that consists of a crystalline phase having a unit cell similar to $Li_2MnO_3$.

The hexagonal layered rock-salt structure is a crystalline phase that can be assigned to the following space group.

R$\overline{3}$m

Specifically, from the standpoint of capacity and cycle characteristics, the crystalline phase preferably has a $LiNiO_2$ hexagonal layered rock-salt structure that consists of a crystalline phase having a unit cell similar to $LiNiO_2$.

The lithium-manganese composite oxide according to the present invention may comprise either a crystalline phase having the monoclinic layered rock-salt structure or a crystalline phase having the hexagonal layered rock-salt structure, or both. In either case, the lithium-manganese composite oxide according to the present invention is a material that has a high specific capacity, excellent charge-and-discharge cycle characteristics, and a high discharge capacity at a high current density (excellent in rate characteristics), when used in a positive electrode material for lithium-ion secondary batteries.

When the lithium-manganese composite oxide according to the present invention contains both a crystalline phase having the monoclinic layered rock-salt structure and a crystalline phase having the hexagonal layered rock-salt structure, the content of the crystalline phase is not particularly limited. Typically, the content of the crystalline phase having the monoclinic layered rock-salt structure is preferably 1 to 99 wt % (in particular 5 to 95 wt %, more preferably 10 to 90 wt %), and the content of the crystalline phase having the hexagonal layered rock-salt structure is preferably 1 to 99 wt % (in particular 5 to 95 wt %, more preferably 10 to 90 wt %) of the total content of the crystalline phase having a layered rock-salt structure taken as 100 wt %.

It is sufficient if the lithium-manganese composite oxide according to the present invention contains a crystalline phase having the monoclinic layered rock-salt structure or a crystalline phase having the hexagonal layered rock-salt structure; and the lithium-manganese composite oxide may also contain a mixed phase containing a crystalline phase having another rock-salt structure whose cation distribution is different (e.g., a cubic rock-salt structure or a spinel structure). Alternatively, the lithium-manganese composite oxide according to the present invention may be a material that consists of a crystalline phase having the monoclinic layered rock-salt structure and/or the hexagonal layered rock-salt structure.

The production method according to the present invention described later is likely to form a lithium-manganese composite oxide that consists of a crystalline phase having the monoclinic layered rock-salt structure and/or the hexagonal layered rock-salt structure. However, when synthesis is performed, for example, at a low temperature of 600° C. or less, the resulting lithium-manganese composite oxide may contain a crystalline phase having a cubic rock-salt structure. Because this crystalline phase having a cubic rock-salt structure also includes a crystalline structure that exhibits excellent charge-and-discharge characteristics, a lithium-manganese composite oxide having this crystalline structure is perfectly acceptable.

However, due to the presence of a crystalline phase having the monoclinic layered rock-salt structure and a crystalline phase having the hexagonal layered rock-salt structure, the lithium-manganese composite oxide of the present invention serves as a material that has a high specific capacity, excellent charge-and-discharge cycle characteristics, and a high discharge capacity at a high current density (excellent in rate characteristics), when used in a positive electrode material for lithium-ion secondary batteries. Accordingly, the crystalline phase having the monoclinic layered rock-salt structure and the crystalline phase having the hexagonal layered rock-salt structure are preferably present at a high proportion. From this viewpoint, when the lithium-manganese composite oxide according to the present invention has another rock-salt structure whose cation distribution is different (e.g., a cubic rock-salt structure or a spinel structure), the proportion of such a structure relative to the crystalline phase of the layered rock-salt structure is as follows: typically, a crystalline phase having the layered rock-salt structure is present in an amount of preferably 1 to 99 wt % (in particular 10 to 95 wt %, more preferably 50 to 90 wt %), and a crystalline phase having another rock-salt structure (e.g., a cubic rock-salt structure or a spinel structure) is present in an amount of 1 to 99 wt % (in particular 5 to 90 wt %, more preferably 10 to 50 wt %), of the total amount of the lithium-manganese composite oxide according to the present invention taken as 100 wt %.

The lithium-manganese composite oxide according to the present invention contains Li and Mn as essential elements as represented by formula (1), and further contains Fe and/or Ni in the form of a solid solution.

In the lithium-manganese composite oxide according to the present invention, Fe and Ni appear to be present as replacements of Li, Mn, etc., within the layered rock-salt structure; however, either Fe or Ni may be present, or Fe and Ni may both be present. More specifically, although Fe is cheaper than Ni, Ni is likely to increase the discharge voltage due to its high oxidation/reduction potential, and is thus likely to reduce the hysteresis during charge and discharge. Thus, Ni is suitable for applications where a high potential is required (e.g., large lithium-ion secondary batteries for automobiles). The amount of Fe ions that corresponds to the amount of Fe and Ni used (y; Fe/(Fe+Ni)) is preferably determined depending on the application of the composite oxide: for example, $0 \leq y < 1.0$, preferably $0.1 \leq y \leq 0.9$, and more preferably $0.3 \leq y \leq 0.7$.

The total content of Fe and Ni that is allowed to be present in the form of a solid solution in the lithium-manganese composite oxide according to the present invention (z value; (Fe+Ni)/(Fe+Ni+Mn)) is 60% or less ($0 < z \leq 0.6$), preferably 1 to 50% ($0.01 \leq z \leq 0.50$), and more preferably 10 to 40% ($0.10 \leq z \leq 0.40$) of the total content of metal ions other than Li ions. A lithium manganese oxide that contains none of Fe ions and Ni ions would be inferior in charge-and-discharge cycle characteristics due to the variable charge and discharge curve shape made by the instable crystalline structure during charge and discharge cycles. On the other hand, a high total content of Fe and Ni leads to a decreased content of Li ions, resulting in a reduced specific capacity.

The lithium-manganese composite oxide according to the present invention has a content ratio of Li to the total content of Fe, Ni, and Mn (Li/(Fe+Ni+Mn)) of 1.55 or less, preferably 1.00 to 1.54, and more preferably 1.20 to 1.53 on a molar ratio basis. A content ratio of Li to the total content of Fe, Ni, and Mn (Li/(Fe+Ni+Mn)) of more than 1.55 deteriorates the specific capacity, charge-and-discharge cycle characteristics, and discharge capacity at a high current density, when the lithium-manganese composite oxide is used in the positive electrode material for a lithium-ion secondary battery.

The lithium-manganese composite oxide according to the present invention preferably has a content ratio of O to the total content of Fe, Ni, and Mn (O/(Fe+Ni+Mn)) of 2.48 or less, more preferably 2.00 to 2.46, and still more preferably 2.30 to 2.45 on a molar ratio basis from the standpoint of improving the specific capacity, charge-and-discharge cycle characteristics, and discharge capacity at a high current density when the lithium-manganese composite oxide is used in the positive electrode material for a lithium-ion secondary battery.

The lithium-manganese composite oxide according to the present invention can have the Li ion content (x) between 0 and 1/3 (0<x≤1/3), depending on the average valence number of transition metals, as long as the crystalline phase having the layered rock-salt structure (in particular, a crystalline phase having the monoclinic layered rock-salt structure or the hexagonal layered rock-salt structure) can be maintained. Typically, the Li ion content (x) is preferably 0.050 to 0.300, more preferably 0.100 to 0.280, and still more preferably 0.150 to 0.250.

Additionally, the lithium-manganese composite oxide according to the present invention may contain an impurity phase, such as of lithium hydroxide, lithium carbonate, iron compounds, nickel compounds, manganese compounds, hydrates of these compounds, and composite metal compounds containing at least two members of lithium, iron and nickel, to such a degree that the impurity phase does not significantly affect the charge-and-discharge characteristics. The impurity content other than the crystalline phase having a rock salt structure (a crystalline phase having the monoclinic layered rock-salt structure, a crystalline phase having the hexagonal layered rock-salt structure, and a crystalline phase having another rock salt structure whose cation distribution is different (e.g., a cubic rock-salt structure)) is within such a range that the effect of the present invention is not impaired. For example, the impurity content is preferably 0 to 10 wt %, and more preferably 0 to 5 wt % in the lithium-manganese composite oxide according to the present invention.

When used in the positive electrode material for a lithium-ion secondary battery, the lithium-manganese composite oxide according to the present invention preferably has a spontaneous magnetization of 0.0070 emu/g or less (0.0070 A·m²/kg or less), more preferably 0.0010 to 0.0050 emu/g (0.0010 to 0.0050 A·m²/kg), and still more preferably 0.0015 to 0.0030 emu/g (0.0015 to 0.0030 A·m²/kg) from the standpoint of further improving the specific capacity, charge-and-discharge cycle characteristics, and discharge capacity at a high current density. The spontaneous magnetization of the lithium-manganese composite oxide according to the present invention is determined by measuring the magnetization with a vibrating-specimen magnetometer at room temperature in a magnetic field within ±1 T, analyzing the magnetization values within 0.5 T or more and within −0.5 T or less by linear regression, and calculating the average of absolute values of the intercepts.

When used in the positive electrode material for a lithium-ion secondary battery, the lithium-manganese composite oxide according to the present invention preferably has a BET specific surface area of 12.0 m²/g or less (in particular 3.0 to 10.0 m²/g, more preferably 5.0 to 9.0 m²/g) when $z≤0.25$, and preferably 16.0 m²/g or less (in particular 5.0 to 15.0 m²/g, more preferably 8.0 to 13.0 m²/g) when $z>0.25$ from the standpoint of further improving the specific capacity, charge-and-discharge cycle characteristics, and discharge capacity at a high current density. The BET specific surface area of the lithium-manganese composite oxide according to the present invention is measured based on the BET theory.

When used in the positive electrode material for a lithium-ion secondary battery, the lithium-manganese composite oxide according to the present invention preferably has a total transition metal content per compositional formula ($g_{total}$) of the lithium-manganese composite oxide of 0.700 or more (in particular 0.702 to 0.900, more preferably 0.705 to 0.800) when $z≤0.25$, and preferably 0.740 or more (in particular 0.742 to 0.900, more preferably 0.745 to 0.800) when $z>0.25$ from the standpoint of further improving the specific capacity, charge-and-discharge cycle characteristics, and discharge capacity at a high current density. In the case of the monoclinic layered rock-salt crystalline structure, the total transition metal content per compositional formula ($g_{total}$) of the lithium-manganese composite oxide according to the present invention is measured by determining the sum of the average occupancy of transition metals at 2c site and 4h site (($2g_{4h}+g_{2c}$)/3) within the Li layer and the average occupancy of transition metals at 4g site and 2b site (($2g_{4g}+g_{2b}$)/3) within the transition metal layer.

When used in the positive electrode material for a lithium-ion secondary battery, the lithium-manganese composite oxide according to the present invention preferably has an average metal content within the Li layer ($g_{MLi}$) of the lithium-manganese composite oxide of 0.010 or more (in particular 0.015 to 0.050, more preferably 0.020 to 0.030) when $z≤0.25$, and preferably 0.025 or more (in particular 0.027 to 0.100, more preferably 0.030 to 0.050) when $z>0.25$ from the standpoint of further improving the specific capacity, charge-and-discharge cycle characteristics, and discharge capacity at a high current density. The average metal content within the Li layer ($g_{MLi}$) of the lithium-manganese composite oxide according to the present invention is measured by determining the average occupancy of the transition metals at 2c site and 4h site within the Li layer (($2g_{4h}+g_{2c}$)/3). The transition metal occupancy of every case above can be determined by X-ray Rietveld refinement.

The content ratio of O to the total content of Fe, Ni, and Mn (O/(Fe+Ni+Mn)) can be determined by X-ray fluorescence spectroscopy. From the standpoint of further improving the specific capacity, charge-and-discharge cycle characteristics, and discharge capacity at a high current density, the content ratio of O to the total content of Fe, Ni, and Mn is preferably 2.48 or less, and more preferably 2.20 to 2.45.

A lithium-manganese composite oxide according to the present invention that satisfies the conditions described above is excellent in charge-and-discharge cycle characteristics, and exhibits a high discharge capacity even during charge and discharge at a high current density (e.g., 300 mA/g or more) (i.e., excellent in rate characteristics). Thus, the lithium-manganese composite oxide according to the present invention is very useful not only in the positive electrode material for compact, consumer-use lithium-ion secondary batteries, but also in the positive electrode material for large lithium-ion secondary batteries, such as for automobiles.

2. Method for Producing Lithium-Manganese Composite Oxide

The lithium-manganese composite oxide according to the present invention can be synthesized by a typical synthesis method for composite oxides. Specifically, the lithium-manganese composite oxide can be synthesized, for example, by a coprecipitation-calcination method, a coprecipitation-hydrothermal-calcination method, or a solid-state reaction method. In particular, the use of the coprecipitation-calcination method is preferable from the standpoint of easily producing a composite oxide that exhibits excellent charge-and-discharge characteristics.

For example, when the coprecipitation-calcination method is used, the lithium-manganese composite oxide according to the present invention can be obtained, for example, by a production method comprising, in the following sequence, the steps of:

(1) making a mixture of a manganese compound and at least one compound selected from the group consisting of a nickel compound and an iron compound into an alkaline mixture to form a precipitate, (2) subjecting the precipitate obtained in step (1) to wet oxidation treatment to allow the precipitate to age, (3) heating the aged precipitate obtained in step (2) together with a lithium compound, and (4) heating a mixture obtained in step (3) in the presence of an organic reducing agent in an inert atmosphere, or in a reducing atmosphere.

(2-1) Step (1)

In step (1), a mixture containing a manganese compound and at least one compound selected from the group consisting of a nickel compound and an iron compound is made alkaline to form a precipitate. Specifically, an alkaline precipitate is easily formed from a solution of a mixture containing a manganese compound and at least one compound selected from the group consisting of a nickel compound and an iron compound.

The manganese compound, the nickel compound, and the iron compound are preferably components capable of forming an aqueous mixture solution containing these compounds. Typically, the use of a water-soluble compound is preferable. Specific examples of such a water-soluble compound include water-soluble salts of chlorides, nitrates, sulfates, oxalates, or acetates of manganese, nickel, or iron, or hydroxides of manganese, nickel, or iron. In regards to the manganese compound, permanganates, such as potassium permanganate, can also make the distribution of metals other than lithium-ions uniform, and thus improve the charge-and-discharge characteristics. These water-soluble compounds for use may be an anhydride or a hydrate. A water-insoluble compound, such as an oxide of manganese, nickel, or iron, can even be used as an aqueous solution, for example, by dissolving them using an acid, such as hydrochloric acid or nitric acid. A starting material compound containing multiple metallic species may also be used. These starting material compounds may be used singly, or in a combination of two or more.

The ratio of the manganese compound, the nickel compound, and the iron compound in the mixture can be the element ratio of the target lithium-manganese composite oxide according to the present invention.

When an aqueous mixture solution is prepared, the concentration of each compound is not particularly limited; and the concentration can be suitably determined such that a homogeneous aqueous mixture solution is formed, and a coprecipitate is smoothly formed. Typically, the total concentration of the manganese compound, the iron compound, and the nickel compound is preferably 0.01 to 5 mol/L, and particularly preferably 0.1 to 2 mol/L.

When an aqueous mixture solution is prepared, the solvent for use may be water alone; or a water-alcohol mixture solvent containing a water-soluble alcohol, such as methanol or ethanol. The use of a water-alcohol mixture solvent allows the water-soluble alcohol to work as an antifreeze liquid, enabling a precipitate to form at a temperature below 0° C. Forming a precipitate at low temperatures can reduce or prevent the generation of impurities, such as lithium ferrite and manganese ferrite, which are likely to occur during the formation of a precipitate containing Fe. Because the use of a water-alcohol mixture solvent makes it possible to use a manganese source such as potassium permanganate, which, however, is difficult to use in forming a precipitate with water alone, a wider range of selection of starting materials becomes available. The amount of an alcohol for use can be suitably determined depending on, for example, the temperature at which a target precipitate is formed. A suitable amount of an alcohol is typically 50 parts by weight or less (e.g., 10 to 50 parts by weight), per 100 parts by weight of water.

Making the mixture (in particular, the aqueous mixture solution) alkaline forms a precipitate (a coprecipitate). The conditions under which an excellent precipitate is formed are not generalized because such conditions vary depending on the type, the concentration, and other factors of each compound contained in the mixture (in particular, the aqueous mixture solution). Typically, a pH of 8 or more (e.g., a pH of 8 to 14) is preferable, and a pH of 11 or more (e.g., a pH of 11 to 14) is more preferable.

The method for making the mixture (in particular, the aqueous mixture solution) alkaline is not particularly limited. Typically, the method is preferably adding the mixture (in particular, the aqueous mixture solution) to an aqueous solution containing an alkali in order to form a homogeneous precipitate. Alternatively, adding an alkali or an aqueous solution containing an alkali to the aqueous mixture solution can also form a precipitate (a coprecipitate).

Examples of the alkali for use in making the mixture (in particular, the aqueous mixture solution) alkaline include alkali metal hydroxides, such as potassium hydroxide, sodium hydroxide, and lithium hydroxide; and ammonia. When these alkalis are used in the form of an aqueous solution, such an aqueous solution for use has a concentration of, for example, 0.1 to 20 mol/L, in particular 0.3 to 10 mol/L. As with the aqueous mixture solution of metal compounds described above, an alkali can be used with water alone for the solvent, or may be dissolved in a water-alcohol mixture solvent containing water and a water-soluble alcohol.

Setting the temperature of the mixture (in particular, the aqueous mixture solution) at typically −50 to 50° C., in particular −20 to 30° C., during precipitate formation reduces or prevents the generation of spinel ferrite caused by heat of neutralization during a reaction, when Fe is contained; and increases its reactivity with a lithium compound described later due to the increased likelihood of the formation of a fine and homogeneous precipitate (coprecipitate), thereby making it easier to synthesize the lithium-manganese composite oxide according to the present invention. To form a precipitate (coprecipitate) in an excellent manner in this step, it is preferable to gradually drop the mixture (in particular, the aqueous mixture solution) onto the aqueous solution containing an alkali over at least a few hours so as to reduce or prevent the generation of heat of neutralization. Although a longer reaction time would be better in this case, an actual reaction time is preferably 1 hour to 1 day, in particular 2 to 12 hours.

(2-2) Step (2)

After a precipitate (coprecipitate) has been formed in step (1), the precipitate (coprecipitate) is subjected to wet oxidation for aging. Specifically, the precipitate (coprecipitate) obtained in step (1) is subjected to wet oxidation treatment to allow the precipitate to age in step (2). More specifically, the precipitate (coprecipitate) obtained in step (1) can be aged by blowing an oxygen-containing gas into an alkali aqueous solution containing the precipitate (coprecipitate) with a compressor or an oxygen gas generator, for example, to subject the precipitate (coprecipitate) to bubbling treatment.

The blowing gas preferably contains a predetermined amount of oxygen. Specifically, the blowing gas preferably contains 10 to 100 vol % of oxygen. Examples of such a blowing gas include air and oxygen, with oxygen being preferable.

The aging temperature is not particularly limited, and is preferably a temperature at which wet oxidation treatment of the precipitate (coprecipitate) can be performed. Typically, the aging temperature is preferably 0 to 150° C., and more preferably 10 to 100° C. The aging time is also not particularly limited, and is preferably a time period during which wet oxidation treatment of the precipitate (coprecipitate) can be performed. Although a longer aging time would be better, an actual aging time is preferably 1 hour to 7 days, and more preferably 12 hours to 4 days.

The obtained precipitate can be optionally purified by washing it with, for example, distilled water, to remove an excessive alkali component, remaining starting materials, etc.; and filtering it.

(2-3) Step (3)

Subsequently, the aged precipitate obtained in step (2) is heated together with a starting material compound containing a lithium compound in step (3). Specifically, it is preferred that the aged precipitate obtained in step (2) be mixed with a lithium compound, and that an aqueous solution containing the thus-obtained starting material compound, which is optionally further formed into a slurry, be heated (in particular calcined).

Typically, the content of the aged precipitate obtained in step (2) in the aqueous solution for use is preferably 50 to 3000 g, and more preferably 100 to 2000 g per liter of water.

Examples of the lithium compound for use include water-soluble lithium salts, such as lithium chloride, lithium iodide, and lithium nitrate; and lithium carbonate. These lithium compounds may be used singly, or in a combination of two or more. The lithium compound for use may also be an anhydride or a hydrate. In particular, lithium hydroxide is preferable from the standpoint of reactivity, and lithium carbonate is preferable from the standpoint of economy.

The lithium compound is preferably used in such an amount that Li/(Fe+Ni+Mn)=1 to 5, in particular 1.5 to 3, based on the total number of moles of the metals in the aged precipitate obtained in step (2).

Typically, the concentration of the lithium compound in the aqueous solution is preferably 0.1 to 10 mol/L, and more preferably 1 to 8 mol/L.

The method for mixing the aged precipitate obtained in step (2) and a lithium compound, optionally with a zirconium compound, is not particularly limited. A preferable example is such that the aged precipitate obtained in step (2) is added to an aqueous solution of a water-soluble lithium compound, and the mixture is stirred to form a dispersion, optionally followed by drying and pulverization.

Stirring can be performed with a typical method. For example, stirring is preferably performed with a known mixer, such as a mixer, a V-mixer, a W-mixer, or a ribbon-mixer.

When drying is performed, the conditions for drying are not particularly limited. The drying temperature is, for example, preferably 20 to 100° C., and more preferably 30 to 80° C. The drying time is, for example, preferably 1 hour to 5 days, and more preferably 12 hours to 3 days.

To improve the reactivity during a heating treatment performed later, pulverization is preferably performed. A preferable degree of pulverization is such that coarse particles are not present, and that the mixture has a uniform color tone. When pulverization is performed, a typical method can be used. For example, pulverization is performed with a vibrational mill, a ball mill, or a jet mill. Pulverization may be repeated twice or more.

Typically, the heating treatment is preferably performed in a heating vessel (e.g., an electric furnace).

Although heating conditions are not particularly limited, the final heating temperature is preferably 750° C. or more to further stabilize the charge-and-discharge cycle characteristics. Additionally, the heating temperature is preferably 1000° C. or less so that lithium is less likely to volatilize. In particular, the final heating temperature is preferably 800 to 950° C. Performing heating (in particular calcination) at a temperature within this range achieves a higher specific capacity, better charge-and-discharge cycle characteristics, and a higher discharge capacity at a high current density (further improves rate characteristics).

The heating atmosphere (in particular, calcination atmosphere) is also not particularly limited. In particular, when the final heating atmosphere is an inert atmosphere, such as nitrogen or argon, it is preferred in order to reduce or prevent the degradation of the specimen that heating (in particular, calcination) be performed at a low temperature of 500 to 750° C. (in particular, 550 to 700° C.) in air beforehand, and that the final heating (in particular, final calcination) be performed in an inert atmosphere. Even though the final heating atmosphere is air, this two-step heating (in particular, calcination) may also be performed to precisely control the Li content, powder properties, etc.

The heating time is not particularly limited. More specifically, the retention time at the final heating temperature is preferably 10 minutes to 24 hours, and more preferably 30 minutes to 12 hours. When the two-step heating treatment is performed, the retention time at the heating temperature in the first step is preferably 10 minutes to 24 hours (in particular, 30 minutes to 12 hours), and the retention time at the final heating temperature in the second step is preferably 10 minutes to 24 hours (in particular, 30 minutes to 12 hours).

(2-4) Step (4)

In step (4), the mixture obtained in step (3) is heated in the presence of an organic reducing agent in an inert atmosphere or in a reducing atmosphere. Specifically, it is preferred that the mixture obtained in step (3) be mixed with an organic reducing agent, and that the mixture be heated in an inert atmosphere or in a reducing atmosphere.

To improve the reactivity during a heating treatment performed later, pulverization is preferably performed before mixing. A preferable degree of pulverization is such that coarse particles are not present, and that the mixture has a uniform color tone. When pulverization is performed, a typical method can be used. For example, pulverization is performed with a vibrational mill, a ball mill, or a jet mill. Pulverization may be repeated twice or more.

The organic reducing agent is not particularly limited. For convenience in the treatment, a water-soluble organic reducing agent is preferable, and examples include polyethylene glycol (PEG), lithium acetate ($CH_3COOLi$), sucrose, glucose, starch, and lithium stearate.

The amount of the organic reducing agent for use is preferably, on the basis of the carbon content present in the reducing agent, 0.01 to 2.00 times, and more preferably 0.10 to 1.00 times one mol of the total content of added transition metals in the mixture obtained in step (3).

The method for mixing the mixture obtained in step (3) with the organic reducing agent is not particularly limited. For example, when the organic reducing agent is a water-soluble compound, it is preferred that while the organic reducing agent is dissolved in water, the mixture obtained in step (3) be added thereto with stirring to disperse the mixture, optionally followed by drying and pulverizing by spreading the result in a Petri dish.

Stirring can be performed with a typical method. For example, stirring is preferably performed with a known mixer, such as a mixer, a V-mixer, a W-mixer, or a ribbon-mixer.

When drying is performed, the conditions for drying are not particularly limited. The drying temperature is, for example, preferably 50 to 200° C., and more preferably 80 to 150° C. The drying time is, for example, preferably 10 minutes to 2 days, and more preferably 30 minutes to 1 day.

To improve the reactivity during a heating treatment performed later, pulverization is preferably performed. A preferable degree of pulverization is such that coarse particles are not present, and that the mixture has a uniform color tone. When pulverization is performed, a typical method can be used. For example, pulverization is performed with a vibrational mill, a ball mill, or a jet mill. Pulverization may be repeated twice or more.

Typically, the heating treatment is preferably performed in a heating vessel (e.g., an electric furnace).

Although the heating conditions are not particularly limited, heating is preferably performed at a temperature at which the layered rock-salt structure present in the mixture obtained in step (3) does not decompose. Specifically, the final heating temperature is preferably 500° C. or less, and more preferably 200 to 400° C. Heating (in particular, calcination) at a temperature within this range achieves a higher specific capacity, better charge-and-discharge cycle characteristics, and a higher discharge capacity at a high current density (further improves rate characteristics).

The heating atmosphere is preferably an inert atmosphere or a reducing atmosphere to bring about the effect of the organic reducing agent. The inert atmosphere gas includes nitrogen and argon. The reducing gas for a reducing atmosphere includes hydrogen and carbon monoxide gas. When a reducing atmosphere is used, a combined atmosphere of such a reducing gas and the inert atmosphere gas may be used. Specifically, a gas that constitutes a reducing atmosphere includes a hydrogen gas, a hydrogen-nitrogen mixture gas, a hydrogen-argon mixture gas, and a carbon monoxide gas.

The heating time is not particularly limited. More specifically, the retention time at the final heating temperature is preferably 10 minutes to 24 hours, and more preferably 30 minutes to 12 hours.

After a lithium-manganese composite oxide according to the present invention is obtained by the method described above, the obtained mixture (a calcined product) may optionally be subjected to, for example, water-washing treatment or solvent-washing treatment to remove the excessive lithium compound. Thereafter, filtration may be performed, and drying by heating may be performed, for example, at 80° C. or more, and preferably 100° C. or more.

3. Lithium-Ion Secondary Battery

A lithium-ion secondary battery using the lithium-manganese composite oxide according to the present invention can be produced by a known method. For example, a lithium-ion secondary battery can be assembled in accordance with an ordinary method using the lithium-manganese composite oxide according to the present invention for the positive electrode material; known metallic lithium, a carbon-based material (e.g., activated carbon or graphite), silicon, silicon oxide, an Si—SiO-based material, lithium titanium oxide, etc., for the anode material; a solution of a lithium salt such as lithium perchlorate or $LiPF_6$ in a solvent composed of at least one member of known ethylene carbonate, dimethyl carbonate, diethyl carbonate, and the like (organic electrolyte) or an inorganic solid electrolyte (e.g., a $Li_2S$—$P_2S_5$-based electrolyte or a $Li_2S$—$GeS_2$—$P_2S_5$-based electrolyte) for the electrolyte; and other known battery components. In the present invention, the phrase "lithium-ion secondary battery" also includes "lithium secondary batteries" in which metallic lithium is used for the anode material. Additionally, in the present invention, the phrase "lithium-ion secondary battery" includes "non-aqueous lithium-ion secondary batteries" containing a non-aqueous electrolyte, and "all-solid-state lithium-ion secondary batteries" containing a solid electrolyte.

EXAMPLES

The following further clarifies features of the present invention with reference to Examples and Comparative Examples. However, the present invention is not limited to the following Examples.

Example 1

Synthesis of Specimen, and Evaluation of Structure and Composition 10.10 g of iron(III) nitrate nonahydrate, 7.27 g of nickel (II) nitrate hexahydrate, and 39.58 g of manganese(II) chloride tetrahydrate (total amount: 0.25 mol, Fe:Ni:Mn molar ratio 1:1:8) were added to 500 mL of distilled water and fully dissolved, thereby obtaining a metal salt aqueous solution. 50 g of sodium hydroxide was weighed in another beaker, and 500 mL of distilled water was added thereto to dissolve sodium hydroxide with stirring, thereby preparing a sodium hydroxide aqueous solution. This sodium hydroxide aqueous solution was placed in a titanium beaker, and allowed to stand in a thermostatic bath maintained at +20° C. Subsequently, the metal salt aqueous solution was gradually added dropwise to this sodium hydroxide solution over about 3 hours, thereby forming an Fe—Ni—Mn precipitate (coprecipitate). After the reaction mixture was confirmed to have completely become alkaline, oxygen was blown into the coprecipitate-containing reaction mixture with stirring at room temperature for 2 days to perform wet-oxidation treatment, thereby aging the precipitate.

The obtained precipitate was washed with distilled water and filtered, followed by mixing with 18.47 g of 0.25 mol lithium carbonate dispersed in distilled water using a mixer, thereby forming a homogeneous slurry. The slurry was transferred to a tetrafluoroethylene Petri dish, dried at 50° C. for 2 days, and pulverized, thereby preparing a starting material for calcination.

Subsequently, the temperature of the obtained powder was increased to 650° C. over 1 hour. After being maintained at this temperature for 5 hours, the powder was cooled to around room temperature in a furnace. After pulverization, the temperature of the pulverized powder was increased to 850° C. again in a nitrogen stream in the electric furnace over 1 hour. After being maintained at this temperature for 5 hours, the result was cooled to around room temperature in the furnace. Specifically, calcination in the first step was performed in air, and calcination in the second step was performed in a nitrogen atmosphere. The calcined product was taken out from the electric furnace, and pulverized. 6.38 g of lithium acetate dihydrate, which was, on a carbon basis, 0.5 times the molar amount of the starting materials was dissolved in distilled water, and all of the calcined product was added thereto, thereby forming a homogeneous slurry. The slurry was transferred to a tetrafluoroethylene Petri dish, dried at 100° C. for a few hours, and pulverized. The pulverized product was placed in an electric furnace, and the temperature was increased to 350° C. in a nitrogen stream over 3 hours. The product was then maintained at this temperature for 1 hour, and cooled in the furnace. The calcined product was taken out from the electric furnace, washed with distilled water to remove the excessive lithium salt, and filtered, followed by drying, thereby obtaining a lithium-manganese composite oxide in the form of a powdery product (target product).

Evaluation by X-Ray Diffraction

FIG. 1 illustrates an actually measured X-ray diffraction pattern (+) and a calculated X-ray diffraction pattern (solid line) of this final product. The results of analysis by the RIETAN-FP program for Rietveld analysis indicate that all peaks can be indexed with the lattice constants shown in Table 1 below, and that the final product was composed only of a crystalline phase having a unit cell (C2/m) of monoclinic crystal $Li_2MnO_3$ (layered rock-salt crystalline phase). The distribution of transition metal ions in the structure shown in Table 2 indicates that the specimen of Example 1 had a higher total transition metal content per compositional formula than the specimen of Comparative Example 1, which was of the same original transition metal composition, and which was not subjected to carbon reduction described later, thus showing that a specimen having a high transition metal ion content per compositional formula was obtained. The average transition metal content in the Li layer (average 2) was also higher than in Comparative Example 1, showing that a specimen having a disordered transition metal distribution was obtained.

Evaluation by Chemical Analysis and Other Analysis

Chemical analysis (Table 3) indicates that the content of Fe and the content of Ni relative to the content of all metals except for lithium remained respectively at 10 mol % and 10 mol %, which were the same as their original contents (y: equivalent to 0.50, z: equivalent to 0.20); and that the ratio Li/(Fe+Ni+Mn), the ratio O/(Fe+Ni+Mn), the specific surface area, and the spontaneous magnetization were decreased, compared with those of Comparative Example 1 described later. This reveals that the target lithium-manganese composite oxide having the compositional formula $Li_{1+x}[(Fe_yNi_{1-y})_zMn_{1-z}]_{1-x}O_2$ was obtained.

Evaluation of Charge-and-Discharge Characteristics

The results illustrated in FIG. 2 and Table 4 reveal that after being activated, the specimen of Example 1 not only exhibited a discharge capacity close to 280 mAh/g, which was higher than that of the specimen of Comparative Example 1, but also exhibited a higher discharge capacity retention rate during 9 cycles after activation treatment than the specimen of Comparative Example 1, which was not subjected to carbon reduction described later. This reveals that the specimen of Example 1 is an excellent positive electrode material that exhibits both a high capacity and long-term cycle characteristics.

Example 2

Figure 3:
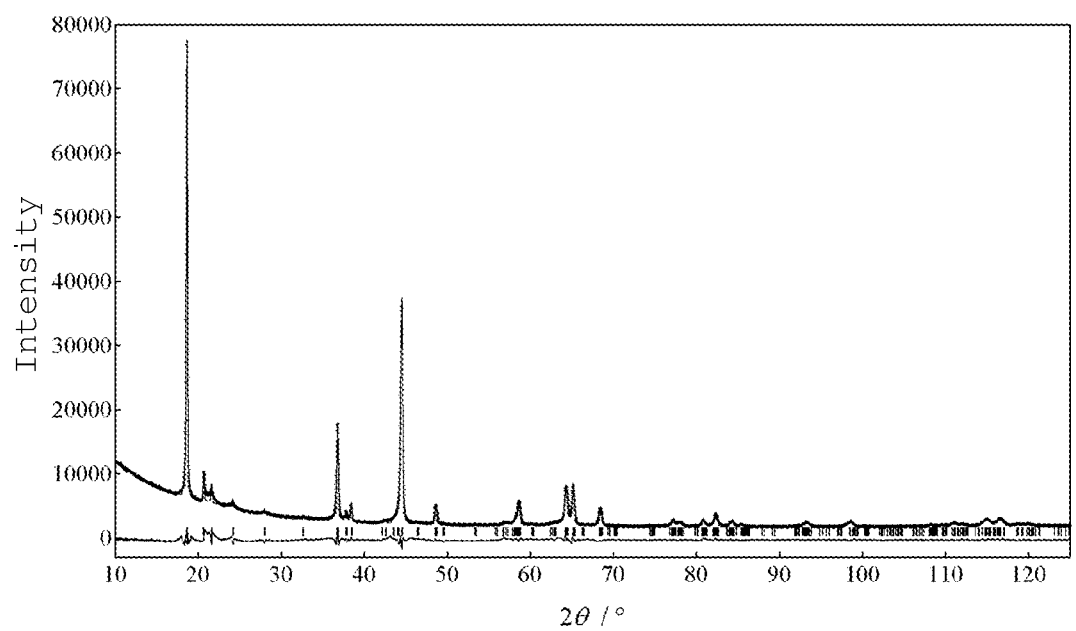
FIG. 3 illustrates X-ray diffraction patterns of a specimen obtained in Example 2: an actually measured pattern (+), and a calculated pattern (solid line).

A specimen was prepared in the same manner as in Example 1, except that the calcination temperature was set at 400° C. during carbon reduction (after lithium acetate was added). FIG. 3 illustrates an actually measured X-ray diffraction pattern (+) and a calculated X-ray diffraction pattern (solid line) of this final product. The results of analysis by the RIETAN-FP program for Rietveld analysis indicate that all peaks can be indexed with the lattice constants shown in Table 1 below, and that the final product was composed only of a crystalline phase having a unit cell (C2/m) of monoclinic crystal $Li_2MnO_3$ (layered rock-salt crystalline phase). The distribution of transition metal ions in the structure shown in Table 2 indicates that the specimen of Example 2 had a higher total transition metal content per compositional formula than the specimen of Comparative Example 1, which was of the same original transition metal composition, and which was not subjected to carbon reduction described later, thus showing that a specimen having a high transition metal ion content per compositional formula was obtained. The average transition metal content in the Li layer (average 2) was also higher than in Comparative Example 1, showing that a specimen having a disordered transition metal distribution was obtained.

Chemical analysis (Table 3) indicates that the content of Fe and the content of Ni relative to the content of all metals except for lithium remained respectively at 10 mol % and 10 mol %, which were the same as their original contents (y: equivalent to 0.50, z: equivalent to 0.20); and that the ratio Li/(Fe+Ni+Mn), the ratio O/(Fe+Ni+Mn), the specific surface area, and the spontaneous magnetization were decreased, compared with those of Comparative Example 1 described later. This reveals that the target lithium-manganese composite oxide having the compositional formula $Li_{1+x}[(Fe_yNi_{1-y})_zMn_{1-z}]_{1-x}O_2$ was obtained.

Figure 4:
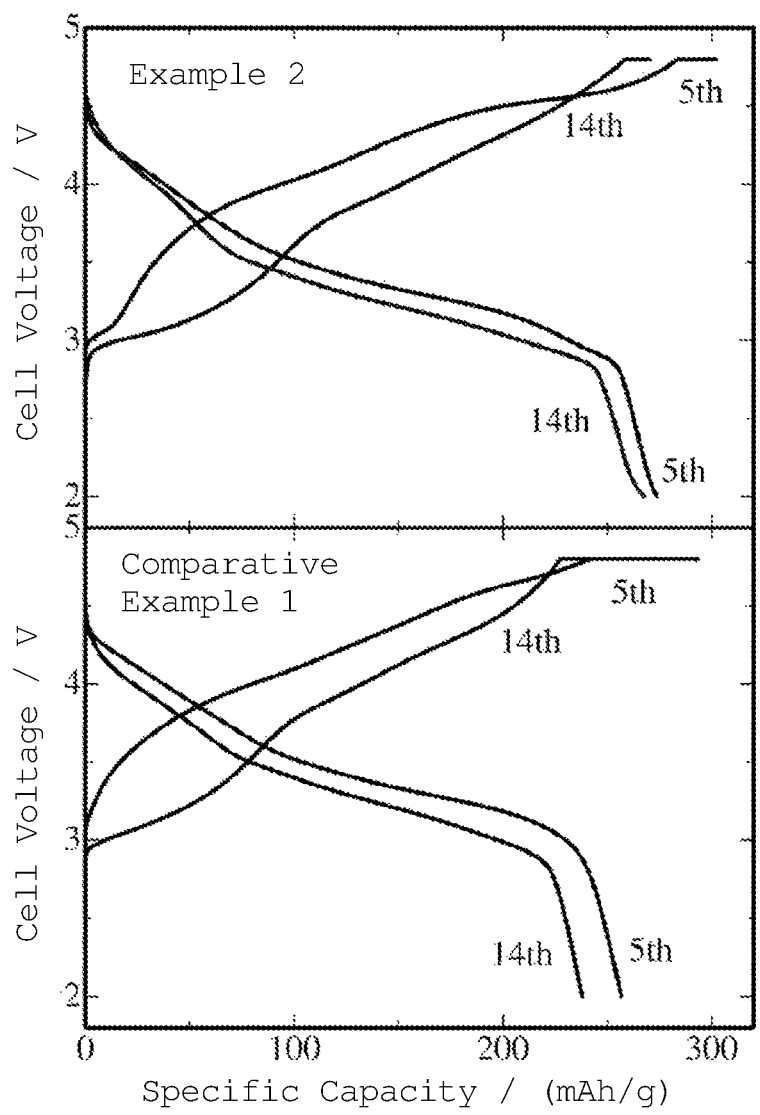
FIG. 4 illustrates charge-and-discharge curves of lithium secondary batteries containing a specimen obtained in Example 2 or Comparative Example 1 for the positive electrode material, and metallic lithium for the anode material.

FIG. 4 and Table 4 illustrate the evaluation results of charge-and-discharge characteristics. The results of FIG. 4 and Table 4 indicate that after being activated, the specimen of Example 2 not only exhibited a discharge capacity close to 275 mAh/g, which was higher than the specimen of Comparative Example 1, but also exhibited a higher discharge capacity retention rate during 9 cycles after activation treatment than the specimen of Comparative Example 1, which was not subjected to carbon reduction described later. This reveals that the specimen of Example 2 is an excellent positive electrode material that exhibits both a high capacity and long-term cycle characteristics.

Comparative Example 1

Figure 5:
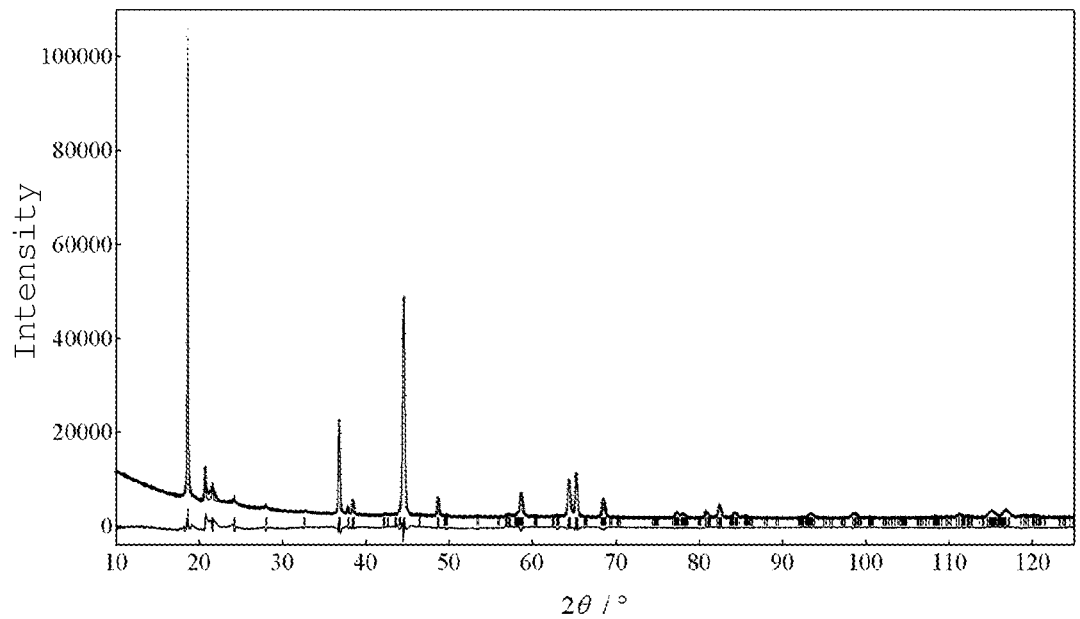
FIG. 5 illustrates X-ray diffraction patterns of a specimen obtained in Comparative Example 1: an actually measured pattern (+), and a calculated pattern (solid line).

A specimen was prepared in the same manner as in Example 1 with the same lot as in Example 1, except that after calcination was performed at 850° C. in a nitrogen atmosphere, carbon reduction using lithium acetate dihydrate was not performed; and that water-washing treatment, filtration, and drying were performed in the same manner. FIG. 5 illustrates an actually measured X-ray diffraction pattern (+) and a calculated X-ray diffraction pattern (solid line) of this final product. The results of analysis by the RIETAN-FP program for Rietveld analysis indicate that all peaks were indexed with the lattice constants shown in Table 1 below, and that the final product was composed only of a crystalline phase having a unit cell (C2/m) of monoclinic crystal $Li_2MnO_3$ (layered rock-salt crystalline phase), as in Examples 1 and 2. The distribution of transition metal ions in the structure shown in Table 2 indicates that the specimen of Comparative Example 1 had a lower total transition metal content per compositional formula than the specimens of Examples 1 and 2, which were subjected to carbon reduction described later, and which were of the same original transition metal composition. The average transition metal content in the Li layer (average 2) was also lower than in Examples 1 and 2.

Chemical analysis (Table 3) indicates that the content of Fe and the content of Ni relative to the content of all metals except for lithium remained respectively at 10 mol % and 10 mol %, which were the same as their original contents (y: equivalent to 0.50, z: equivalent to 0.20); and that the ratio Li/(Fe+Ni+Mn), the ratio O/(Fe+Ni+Mn), the specific surface area, and the spontaneous magnetization were higher than those of Examples 1 and 2.

Figure 2:
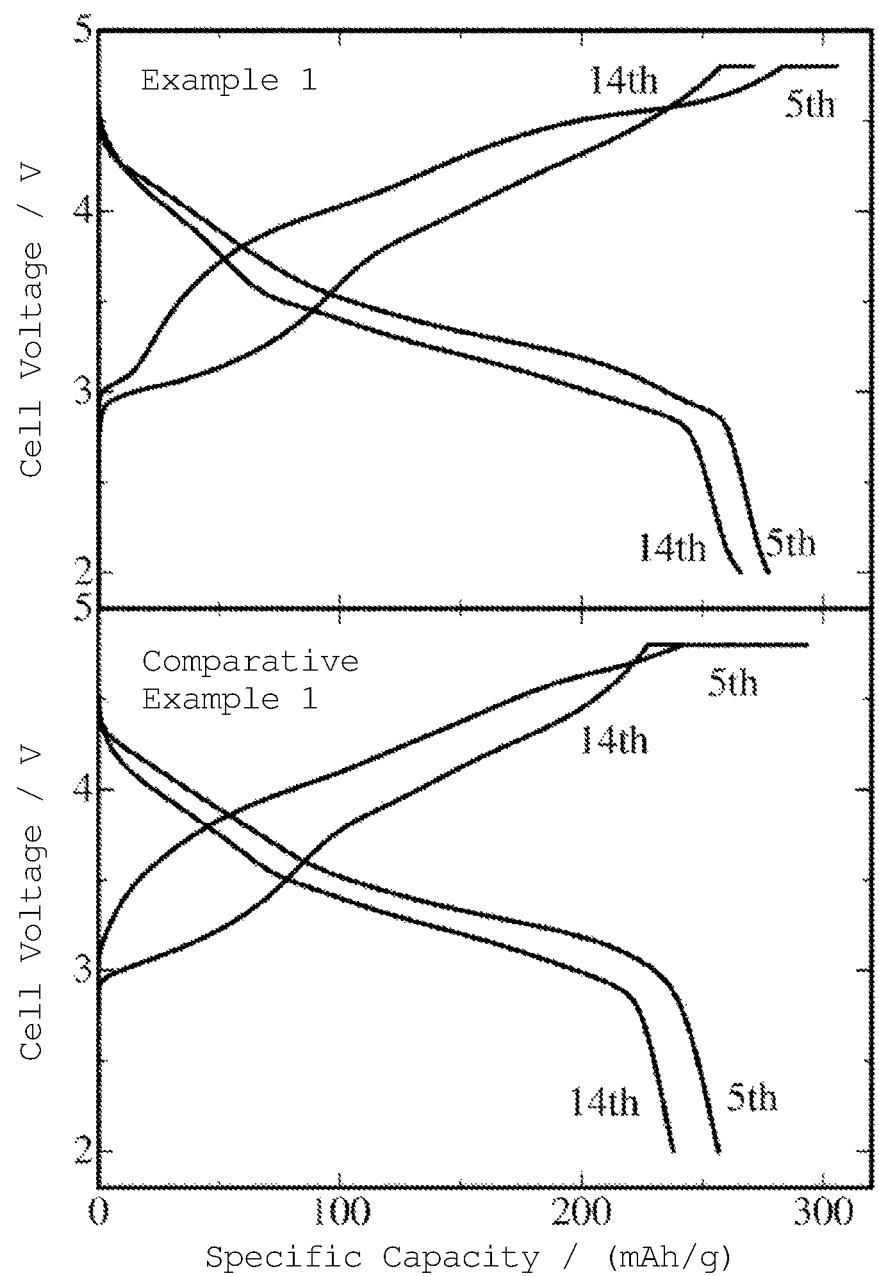
FIG. 2 illustrates charge-and-discharge curves of lithium secondary batteries containing a specimen obtained in Example 1 or Comparative Example 1 for the positive electrode material, and metallic lithium for the anode material.

FIGS. 2 and 4, and Table 4 illustrate the evaluation results of charge-and-discharge characteristics. The results of FIGS. 2 and 4, and Table 4 indicate that after being activated, the specimen of Comparative Example 1 not only exhibited a lower specific capacity than in Examples 1 and 2, but also exhibited a lower discharge capacity retention rate during 9 cycles after activation treatment than in Examples 1 and 2. This reveals that the specimen of Comparative Example 1 is not a positive electrode material that exhibits both a high capacity and long-term cycle characteristics.

Example 3

Figure 6:
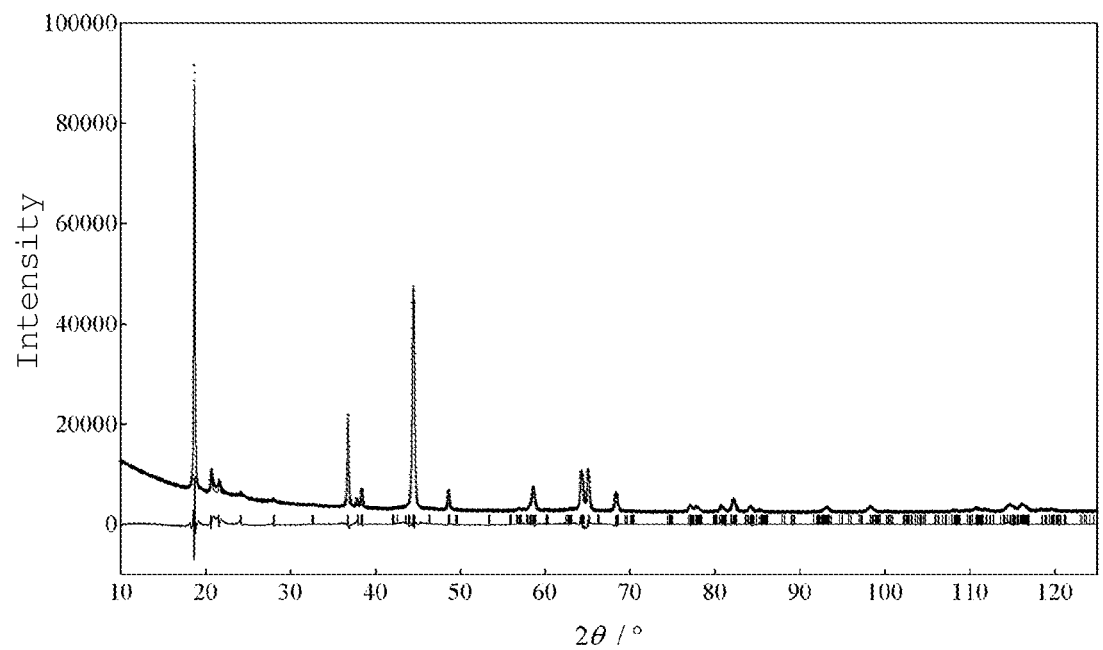
FIG. 6 illustrates X-ray diffraction patterns of a specimen obtained in Example 3: an actually measured pattern (+), and a calculated pattern (solid line).

15.15 g of iron(III) nitrate nonahydrate, 10.90 g of nickel (II) nitrate hexahydrate, and 34.63 g of manganese(II) chloride tetrahydrate (total amount: 0.25 mol, Fe:Ni:Mn molar ratio 15:15:70) were added to 500 mL of distilled water and fully dissolved, thereby preparing a metal salt aqueous solution. A specimen was prepared in the same manner as in Example 1, except that this metal salt aqueous solution was used. FIG. 6 illustrates an actually measured X-ray diffraction pattern and (+) and a calculated X-ray diffraction pattern (solid line) of this final product The results of analysis by the RIETAN-FP program for Rietveld analysis indicate that all peaks were indexed with the lattice constants shown in Table 1 below, and the final product was composed only of a crystalline phase having a unit cell (C2/m) of monoclinic crystal $Li_2MnO_3$ (layered rock-salt crystalline phase). The distribution of transition metal ions in the structure shown in Table 2 indicates that the specimen of Example 3 had a higher total transition metal content per compositional formula than the specimen of Comparative Example 2, which was of the same original transition metal composition; and which was not subjected to carbon reduction described later, thus showing that a specimen having a high transition metal ion content per compositional formula was obtained. The average transition metal content in the Li layer (average 2) was also higher than in Comparative Example 2, showing that a specimen having a disordered transition metal distribution was obtained.

Chemical analysis (Table 3) indicates that the content of Fe and the content of Ni relative to the content of all metals except for lithium remained respectively at 15 mol % and 15 mol %, which were the same as their original contents (y: equivalent to 0.50, z: equivalent to 0.30); and that the ratio Li/(Fe+Ni+Mn), the ratio O/(Fe+Ni+Mn), the specific surface area, and the spontaneous magnetization were decreased, compared with those of Comparative Example 2 described later. This reveals that the target lithium-manganese composite oxide having the compositional formula $Li_{1+x}[(Fe_yNi_{1-y})_zMn_{1-z}]_{1-x}O_2$ was obtained.

Figure 7:
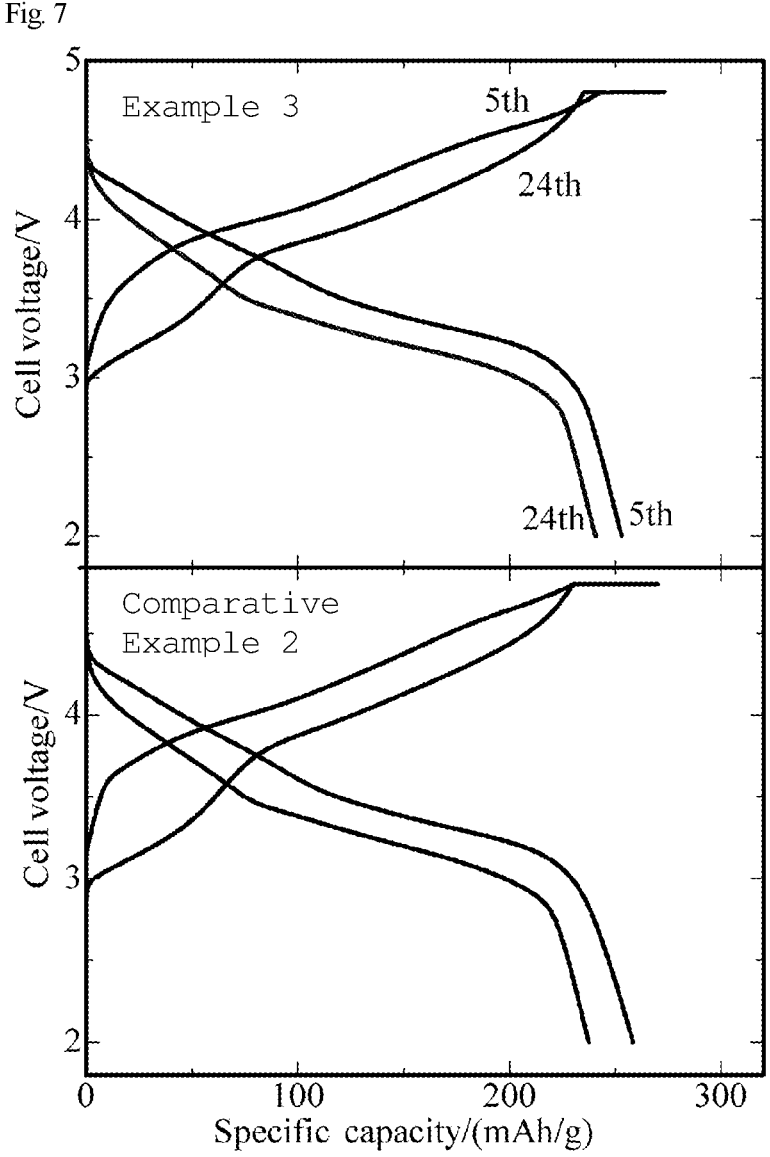
FIG. 7 illustrates charge-and-discharge curves of lithium secondary batteries containing a specimen obtained in Example 3 or Comparative Example 2 for the positive electrode material, and metallic lithium for the anode material.
Figure 8:
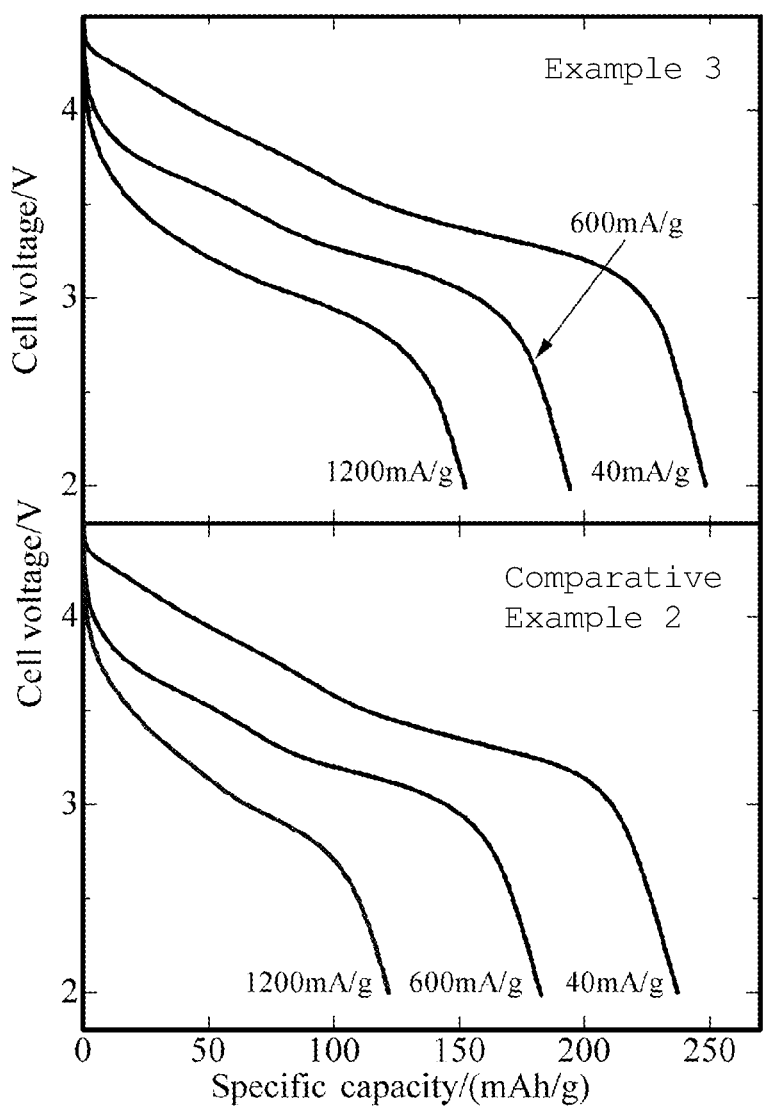
FIG. 8 illustrates the evaluation results of rate characteristics of lithium secondary batteries containing a specimen obtained in Example 3 or Comparative Example 2 for the positive electrode material, and metallic lithium for the anode material.

FIG. 7 and Table 5 illustrate the evaluation results of charge-and-discharge characteristics, and FIG. 8 and Table 6 illustrate the evaluation results of rate characteristics. The results of FIG. 7 and Table 5 indicate that after being activated, the specimen of Example 3 not only exhibited a discharge capacity of 250 mAh/g or more, but also exhibited a higher discharge capacity retention rate during 19 cycles after activation treatment than the specimen of Comparative Example 2, which was not subjected to carbon reduction described later. This reveals that the specimen of Example 3 is an excellent positive electrode material that exhibits both a high capacity and long-term cycle characteristics. Additionally, the results of FIG. 8 and Table 6 indicate that the specimen of Example 3 exhibited a high discharge capacity even during charge and discharge at a high current density of 600 mA/g or more. This reveals that the specimen of Example 3 is a positive electrode material that is also excellent in rate characteristics (discharge rate characteristics).

Comparative Example 2

Figure 9:
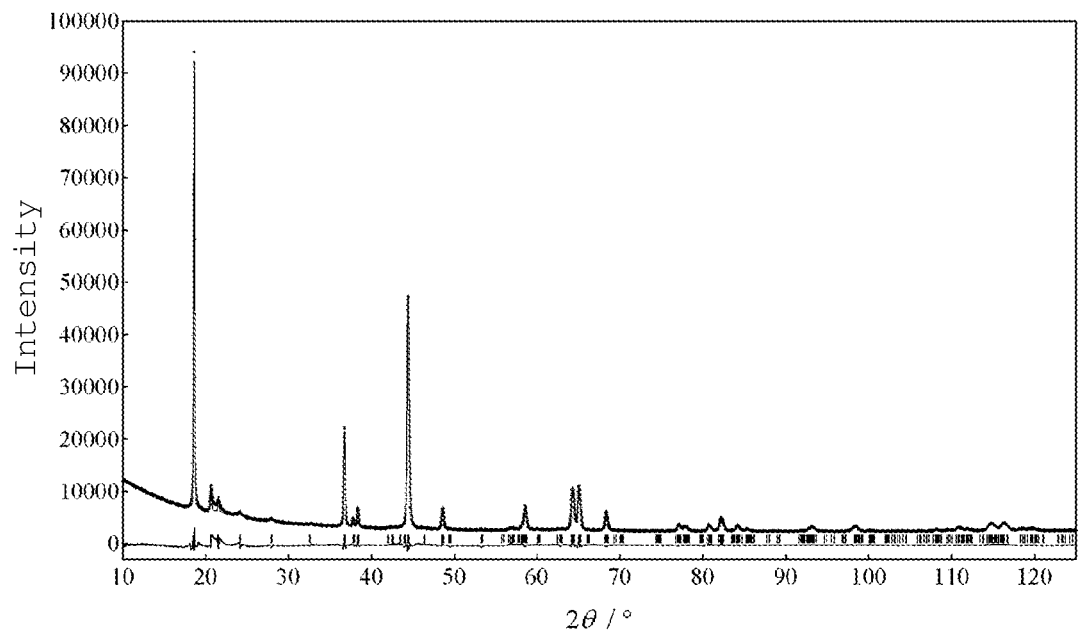
FIG. 9 illustrates X-ray diffraction patterns of a specimen obtained in Comparative Example 2: an actually measured pattern (+), and a calculated pattern (solid line).

A specimen was prepared in the same manner as in Example 3 with the same lot as in Example 3, except that after calcination was performed at 850° C. in a nitrogen atmosphere, carbon reduction using lithium acetate dihydrate was not performed; and that water-washing treatment, filtration, and drying were performed in the same manner. FIG. 9 illustrates an actually measured X-ray diffraction pattern (+) and a calculated X-ray diffraction pattern (solid line) of this final product. The results of analysis by the RIETAN-FP program for Rietveld analysis indicate that all peaks were indexed with the lattice constants shown in Table 1 below, and that the final product was composed only of a crystalline phase having a unit cell (C2/m) of monoclinic crystal $Li_2MnO_3$ (layered rock-salt crystalline phase), as in Example 3. The distribution of transition metal ions in the structure shown in Table 2 indicates that the specimen of Comparative Example 2 had a lower total transition metal content per compositional formula than the specimen of Example 3, which was subjected to carbon reduction described later, and which was of the same original transition metal composition. The average transition metal content in the Li layer (average 2) was also lower than in Example 3.

Chemical analysis (Table 3) indicates that the content of Fe and the content of Ni relative to the content of all metals except for lithium remained respectively at 15 mol % and 15 mol %, which were the same as their original contents (y: equivalent to 0.50, z: equivalent to 0.30); and that the ratio Li/(Fe+Ni+Mn), the ratio O/(Fe+Ni+Mn), the specific surface area, and the spontaneous magnetization were higher than those of Example 3.

FIG. 7 and Table 5 illustrate the evaluation results of charge-and-discharge characteristics, and FIG. 8 and Table 6 illustrate the evaluation results of rate characteristics. The results of FIG. 7 and Table 5 indicate that after being activated, the specimen of Comparative Example 2 exhibited a high discharge capacity, but exhibited a lower discharge capacity retention rate during 19 cycles after activation treatment than the specimen of Example 3, which was subjected to carbon reduction. The results of FIG. 8 and Table 6 also indicate that the specimen of Comparative Example 2 exhibited a lower discharge capacity during charge and discharge at a high current density of 600 mA/g or more than the specimen of Example 3, which was subjected to carbon reduction. This reveals that the specimen of Comparative Example 2 is not a specimen that exhibits both long-term cycle characteristics and excellent rate characteristics (discharge rate characteristics), compared with the specimen of Example 3.

Example 4

Figure 10:
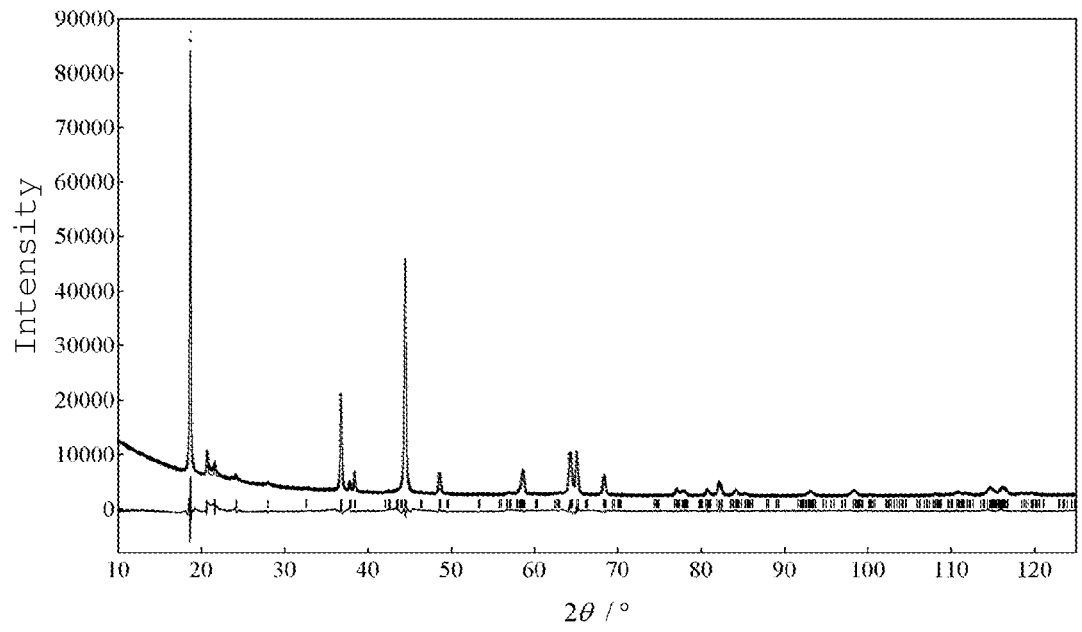
FIG. 10 illustrates X-ray diffraction patterns of a specimen obtained in Example 4: an actually measured pattern (+), and a calculated pattern (solid line).

A specimen was prepared in the same manner as in Example 3, except that 3.04 g of polyethylene glycol (H(OCH$_2$CH$_2$)$_4$OH) was used, instead of 6.38 g of lithium acetate dihydrate, as an organic reducing agent FIG. 10 illustrates an actually measured X-ray diffraction pattern and (+) and a calculated X-ray diffraction pattern (solid line) of this final product The results of analysis by the RIETAN-FP program for Rietveld analysis indicate that all peaks were indexed with the lattice constants shown in Table 1 below, and that the final product was composed only of a crystalline phase having a unit cell (C2/m) of monoclinic crystal Li$_2$MnO$_3$ (layered rock-salt crystalline phase). The distribution of transition metal ions in the structure shown in Table 2 indicates that the specimen of Example 4 had a higher total transition metal content per compositional formula than the specimen of Comparative Example 3, which was of the same original transition metal composition, and which was not subjected to carbon reduction described later, thus showing that a specimen having a high transition metal ion content per compositional formula was obtained. The average transition metal content in the Li layer (average 2) was also higher than in Comparative Example 3, showing that a specimen having a disordered transition metal distribution was obtained.

Chemical analysis (Table 3) indicates that the content of Fe and the content of Ni relative to the content of all metals except for lithium remained respectively at 15 mol % and 15 mol %, which were the same as their original contents (y: equivalent to 0.50, z: equivalent to 0.30); and that the ratio Li/(Fe+Ni+Mn) and the specific surface area were higher than those of Comparative Example 3 described later. This reveals that the target lithium-manganese composite oxide having the compositional formula Li$_{1+x}$[(Fe$_y$Ni$_{1-y}$)$_z$Mn$_{1-z}$]$_{1-x}$O$_2$ was obtained.

Figure 11:
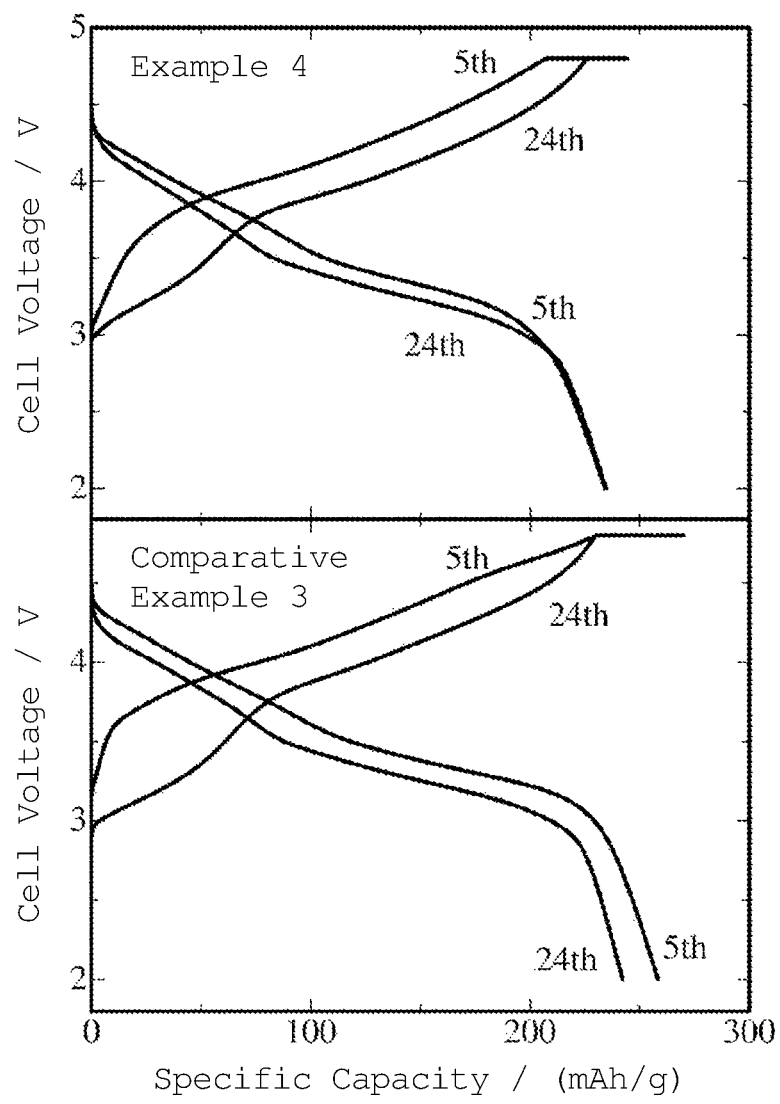
FIG. 11 illustrates charge-and-discharge curves of lithium secondary batteries containing a specimen obtained in Example 4 or Comparative Example 3 for the positive electrode material, and metallic lithium for the anode material.
Figure 12:
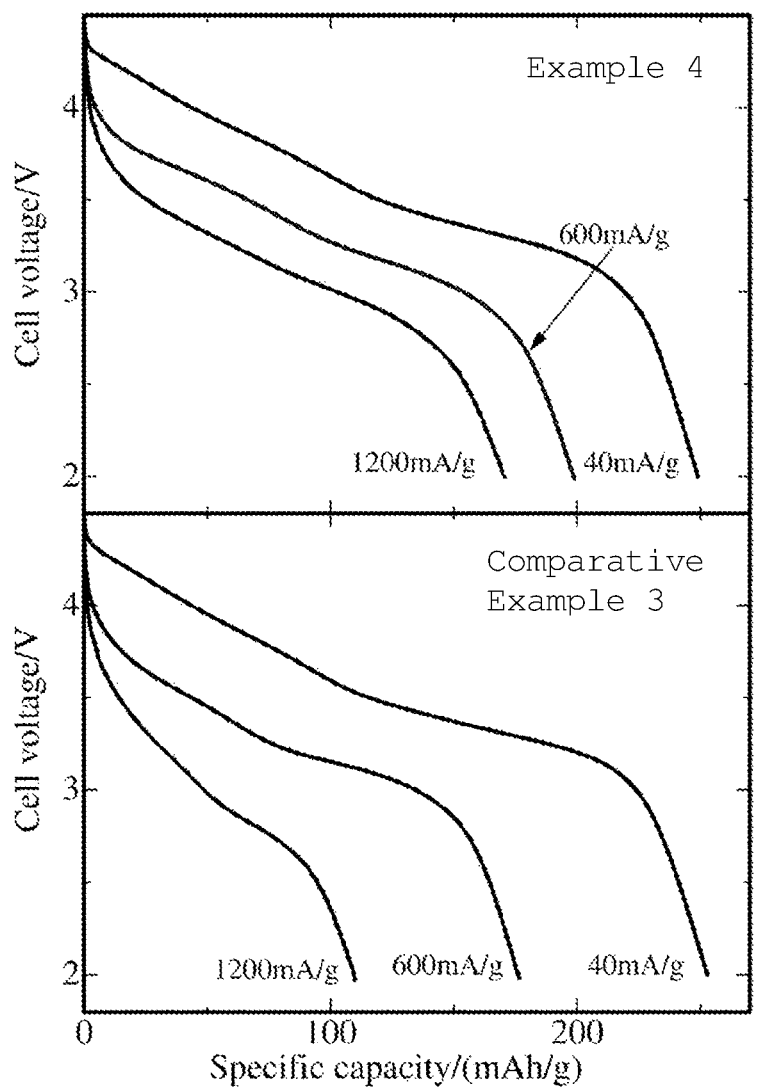
FIG. 12 illustrates the evaluation results of rate characteristics of lithium secondary batteries containing a specimen obtained in Example 4 or Comparative Example 3 for the positive electrode material, and metallic lithium for the anode material.

FIG. 11 and Table 5 illustrate the evaluation results of charge-and-discharge characteristics, and FIG. 12 and Table 6 illustrate the evaluation results of rate characteristics. The results of FIG. 11 and Table 5 indicate that after being activated, the specimen of Example 4 not only exhibited a discharge capacity close to 235 mAh/g, but also exhibited a higher discharge capacity retention rate during 19 cycles after activation treatment than the specimen of Comparative Example 3, which was not subjected to carbon reduction described later. This reveals that the specimen of Example 4 is an excellent positive electrode material that exhibits both a high capacity and long-term cycle characteristics. The results of FIG. 12 and Table 6 indicate that the specimen of Example 4 even exhibited a high discharge capacity during charge and discharge at a high current density of 600 mA/g or more, revealing that the specimen of Example 4 is a positive electrode material that is also excellent in rate characteristics (discharge rate characteristics).

Comparative Example 3

Figure 13:
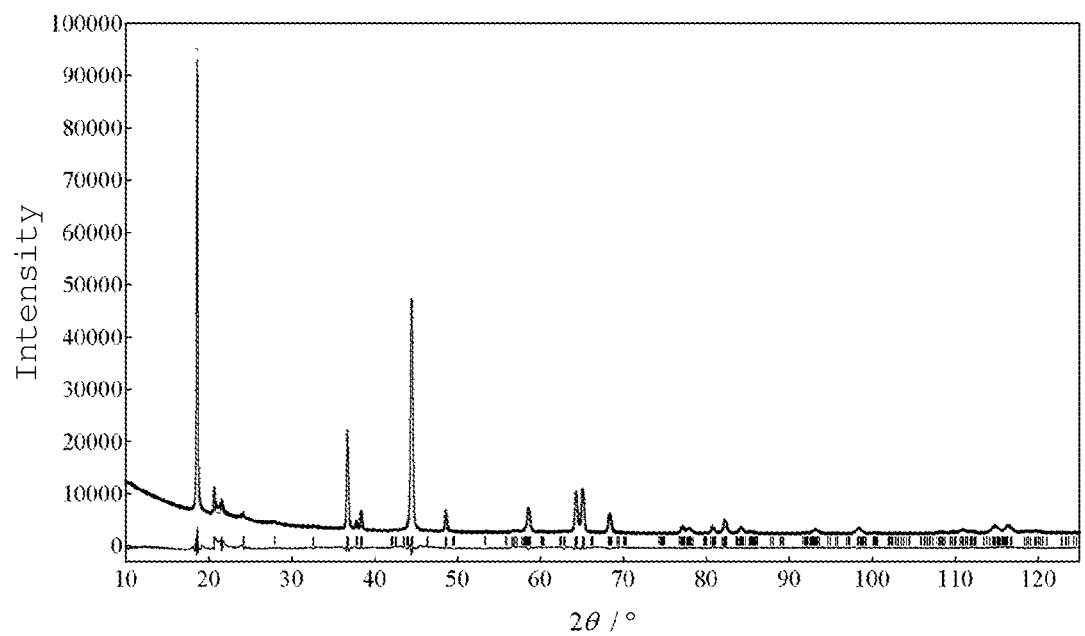
FIG. 13 illustrates X-ray diffraction patterns of a specimen obtained in Comparative Example 3: an actually measured pattern (+), and a calculated pattern (solid line).

A specimen was prepared in the same manner as in Example 4 with the same lot as in Example 4, except that after calcination was performed at 850° C. in a nitrogen atmosphere, carbon reduction using polyethylene glycol was not performed; and that water-washing treatment, filtration, and drying were performed in the same manner. FIG. 13 illustrates an actually measured X-ray diffraction pattern (+) and a calculated X-ray diffraction pattern (solid line) of this final product. The results of analysis by the RIETAN-FP program for Rietveld analysis indicate that all peaks were indexed with the lattice constants shown in Table 1 below; and that the final product was composed only of a crystalline phase having a unit cell (C2/m) of monoclinic crystal Li$_2$MnO$_3$ (layered rock-salt crystalline phase), as in Example 4. The distribution of transition metal ions in the structure shown in Table 2 indicates that the specimen of Comparative Example 3 had a lower total transition metal content per compositional formula than the specimen of Example 4, which was subjected to carbon reduction described later, and which was of the same original transition metal composition. The average transition metal content in the Li layer (average 2) was also lower than in Example 4.

Chemical analysis (Table 3) indicates that the content of Fe and the content of Ni relative to the content of all metals except for lithium remained respectively at 15 mol % and 15 mol %, which were the same as their original contents (y: equivalent to 0.50, z: equivalent to 0.30); and that the ratio Li/(Fe+Ni+Mn) and the specific surface area were higher than those of Example 3.

FIG. 11 and Table 5 illustrate the evaluation results of charge-and-discharge characteristics, and FIG. 12 and Table 6 illustrate the evaluation results of rate characteristics. The results of FIG. 11 and Table 5 indicate that after being activated, the specimen of Comparative Example 3 exhibited a high discharge capacity, but exhibited a lower discharge capacity retention rate during 19 cycles after activation treatment than the specimen of Example 4, which was subjected to carbon reduction. The results of FIG. 8 and Table 6 indicate that the specimen of Comparative Example 3 exhibited a lower discharge capacity during charge and discharge at a high current density of 600 mA/g or more than the specimen of Example 4, which was subjected to carbon reduction. This reveals that the specimen of Comparative Example 3 is not a specimen that exhibits both long-term cycle characteristics and excellent rate characteristics (discharge rate characteristics), compared with the specimen of Example 4.

Test Results

Evaluation Based on X-Ray Diffraction

The X-ray diffraction patterns of the specimens obtained in Examples 1 to 4 and Comparative Examples 1 to 3 were analyzed by the RIETAN-FP program for Rietveld analysis (F Izumi, K. Momma, "Three-Dimensional Visualization in Powder Diffraction," Solid State Phenomena, Vol. 130, pp. 15-20, 2007). The lattice constant and lattice volume of each specimen were evaluated based on the results of analysis. Table 1 illustrates the results. In Table 1, a, b, and c denote the length of each edge, and β denotes the angle between edges c and a. V denotes the lattice volume.

TABLE 1

|  | a/Å | b/Å | c/Å | β/° | V/Å³ | Crystalline Structure |
| --- | --- | --- | --- | --- | --- | --- |
| Example 1 | 4.9549 (4) | 8.5721 (5) | 5.0262 (3) | 109.095 (7) | 201.7 (5) | Li$_2$MnO$_3$-type, Monoclinic layered rock-salt-type |
| Example 2 | 4.9582 (4) | 8.5756 (5) | 5.0288 (3) | 109.095 (8) | 202.0 (6) | Li$_2$MnO$_3$-type, Monoclinic layered rock-salt-type |

TABLE 1-continued

| | a/Å | b/Å | c/Å | β/° | V/Å³ | Crystalline Structure |
|---|---|---|---|---|---|---|
| Example 3 | 4.9609 (3) | 8.5920 (4) | 5.0277 (2) | 109.085 (5) | 202.5 (3) | $Li_2MnO_3$-type, Monoclinic layered rock-salt-type |
| Example 4 | 4.9590 (3) | 8.5910 (3) | 5.02360 (19) | 109.076 (4) | 202.3 (3) | $Li_2MnO_3$-type, Monoclinic layered rock-salt-type |
| Comparative Example 1 | 4.9493 (3) | 8.5708 (4) | 5.0262 (2) | 109.030 (4) | 201.5 (3) | $Li_2MnO_3$-type, Monoclinic layered rock-salt-type |
| Comparative Example 2 | 4.9621 (4) | 8.5920 (4) | 5.0327 (2) | 109.081 (6) | 202.8 (4) | $Li_2MnO_3$-type, Monoclinic layered rock-salt-type |
| Comparative Example 3 | 4.9622 (4) | 8.5928 (4) | 5.0325 (2) | 109.070 (5) | 202.8 (4) | $Li_2MnO_3$-type, Monoclinic layered rock-salt-type |

Based on the X-ray diffraction patterns of the specimens obtained in Examples 1 to 4 and Comparative Examples 1 to 3, a calculated pattern determined from a structure model designed with the transition metal content at each lattice position as a variable was incorporated into the actually measured pattern, thereby evaluating the distribution of transition metal ions in the structure. Table 2 illustrates the results.

When Mn ions are regularly arrayed in $Li_2MnO_3$ (a known substance), Mn fully occupies the honeycomb lattice-constituting sites (4g) (100%); and Mn ions are not present in other sites, such as in the center of the hexagonal mesh (2b) (Li site). In reality, however, the occupancy of Mn ions at 4g sites is not 100%, and some Mn ions are positioned in three Li sites. In Table 2, $g_{4g}$ indicates the Mn occupancy at the honeycomb lattice-constituting site (4g), $g_{2b}$ indicates the Mn occupancy at 2b site, $g_{2c}$ indicates the Mn occupancy at 2c site, and $g_{4h}$ indicates the Mn occupancy at 4h site. Average 1 indicates the average occupancy (element ratio (%)) of transition metal elements at lattice positions (4g and 2b sites) in the Li—Mn layer. Average 2 indicates the average occupancy of transition metal elements (element ratio (%)) at lattice positions (4h and 2c sites) in the Li layer. The total transition metal content indicates the sum of the occupancy of transition metal elements (element ratio (%)) at the lattice positions (4g and 2b) in the Li layer and the occupancy of transition metal elements (element ratio (%)) at the lattice positions (4h and 2c) in the Li—Mn layer in the case of the monoclinic layered rock-salt structure model. Lower average 1 with higher average 2 indicates that transition metal ions are irregularly arrayed.

TABLE 2

| | $g_{4g}$ | $g_{2b}$ | Average 1 | $g_{2c}$ | $g_{4h}$ | Average 2 | Total Transition Metal Content |
|---|---|---|---|---|---|---|---|
| Example 1 | 0.814 (4) | 0.480 (3) | 0.703 (4) | 0 (fixed) | 0.0334 (17) | 0.0223 (11) | 0.725 (5) |
| Example 2 | 0.791 (4) | 0.471 (3) | 0.684 (4) | 0.051 (3) | 0.006 (2) | 0.021 (2) | 0.705 (6) |
| Example 3 | 0.805 (3) | 0.520 (3) | 0.710 (3) | 0 (fixed) | 0.0534 (15) | 0.0356 (10) | 0.746 (4) |
| Example 4 | 0.798 (4) | 0.537 (4) | 0.711 (4) | 0 (fixed) | 0.0529 (16) | 0.0353 (11) | 0.746 (5) |
| Comparative Example 1 | 0.787 (3) | 0.476 (3) | 0.683 (3) | 0 (fixed) | 0.0136 (17) | 0.0091 (11) | 0.692 (4) |
| Comparative Example 2 | 0.814 (3) | 0.513 (3) | 0.714 (3) | 0 (fixed) | 0.0336 (14) | 0.0224 (9) | 0.736 (4) |
| Comparative Example 3 | 0.813 (3) | 0.517 (3) | 0.714 (3) | 0 (fixed) | 0.0347 (14) | 0.0231 (9) | 0.737 (4) |

Evaluation Based on Chemical Analysis

Chemical analysis was performed on the specimens obtained in Examples 1 to 4 and Comparative Examples 1 to 3 by ICP optical emission spectrometry. Table 3 illustrates the results.

TABLE 3

| | x | y | z | Li/ (Fe + Ni + Mn) | Fe/ (Fe + Ni + Mn) | Ni/ (Fe + Ni + Mn) | O/ (Fe + Ni + Mn) | Specific Surface Area ($m^2$/g) | Ms (emu/g) |
|---|---|---|---|---|---|---|---|---|---|
| Example 1 | 0.174 | 0.50 | 0.20 | 1.42 | 0.10 | 0.10 | 2.44 | 8.6 | 0.0204 (3) |
| Example 2 | 0.174 | 0.50 | 0.20 | 1.42 | 0.10 | 0.10 | 2.37 | 8.8 | 0.0197 (3) |
| Example 3 | 0.206 | 0.50 | 0.30 | 1.52 | 0.15 | 0.15 | 2.41 | 11.9 | 0.0260 (3) |
| Example 4 | 0.200 | 0.50 | 0.30 | 1.50 | 0.15 | 0.15 | — | 12.4 | — |

TABLE 3-continued

| | x | y | z | Li/ (Fe + Ni + Mn) | Fe/ (Fe + Ni + Mn) | Ni/ (Fe + Ni + Mn) | O/ (Fe + Ni + Mn) | Specific Surface Area ($m^2$/g) | Ms (emu/g) |
|---|---|---|---|---|---|---|---|---|---|
| Comparative Example 1 | 0.265 | 0.50 | 0.20 | 1.72 | 0.10 | 0.10 | 2.58 | 12.4 | 0.00716 (4) |
| Comparative Example 2 | 0.219 | 0.50 | 0.30 | 1.56 | 0.15 | 0.15 | 2.50 | 17.1 | 0.00725 (5) |
| Comparative Example 3 | 0.219 | 0.50 | 0.30 | 1.56 | 0.15 | 0.15 | — | 17.4 | — |

Evaluation of Charge-And-Discharge Characteristics

A charge-and-discharge test was performed using the specimens obtained in Examples 1 to 4 and Comparative Examples 1 to 3 in positive electrode materials. Specifically, 5 mg of specimens obtained in Examples 1 to 4 and Comparative Examples 1 to 3 were individually well mixed with 5 mg of acetylene black; and 0.5 mg of polytetrafluoroethylene powder was added to the mixture to bind them, followed by bonding the result onto an Al mesh by pressure, thereby preparing a positive electrode. Each of the obtained positive electrodes was vacuum-dried at 120° C. overnight, and lithium secondary cells were prepared in a glove box. A solution of $LiPF_6$ in a mixture solvent of ethylene carbonate (EC) and dimethyl carbonate (DMC) (volume ratio 3:7) was used for the electrolyte, and metallic lithium was used for the negative electrode.

After stepwise charging treatment for obtaining an activated specimen was performed, the charge-and-discharge test was shifted to a constant current cycle test. The test was started with charging, and a charge-discharge cycle was performed by increasing the charge capacity in the order of 80, 120, 160, and 200 mAh/g within the potential range of 2.0-4.8 V at a test temperature of 30° C. and at a current density of 40 mA/g. At the 5th cycle, activation treatment was performed by constant current-constant voltage charge (the cutoff current at 4.8 V is 10 mA/g) until 4 8 V. This stepwise charging activation treatment is essential in evaluation of the charge-and-discharge characteristics of the lithium-manganese composite oxide according to the present invention. In particular, this treatment is an essential process for a composite containing Fe. After activation treatment, the specimens of Examples 1 and 2 and Comparative Example 1 were subjected to constant-current charge and discharge (40 mA/g) within the range of 2.0-4.8 V, and evaluated until the 9th cycle (14 cycles in total), thereby evaluating the capacity retention rate over the course of cycles. FIGS. 2 and 4, and Table 4 illustrate the results. After activation treatment, the specimens of Examples 3 and 4 and Comparative Examples 2 and 3 were subjected to constant-current charge and discharge (40 mA/g) within the range of 2.0-4.8 V; and evaluated until the 19th cycle (24 cycles in total), thereby evaluating the capacity retention rate and rate characteristics over the course of cycles. FIGS. 7 and 11, and Table 5 illustrate the results. FIGS. 2 and 4 illustrate the charge-and-discharge curves during $1^{st}$ charge cycle ($5^{th}$ cycle) after activation treatment, and discharge curves during $9^{th}$ charge cycle ($14^{th}$ cycle) after activation treatment. FIGS. 7 and 11 illustrate the charge-and-discharge curves during $1^{st}$ charge cycle after activation treatment ($5^{th}$ cycle), and the charge-and-discharge curves during $19^{th}$ charge cycle ($24^{th}$ cycle) after activation treatment. In each figure, the upward-sloping curve from bottom-left to top-right corresponds to charging, and the downward-sloping curve from top-left to bottom-right corresponds to discharging. In Tables 4 and 5, $Q_{5c}$ indicates the capacity during $1^{st}$ charge cycle after activation treatment, $Q_{5d}$ indicates the capacity during $1^{st}$ discharge cycle after activation treatment, $Q_{14d}$ indicates the capacity during $9^{th}$ discharge cycle after activation treatment, $100(Q_{14d}/Q_{5d})$ % indicates the retention rate (cycle characteristics) of the discharge capacity when $9^{th}$ charge-and-discharge cycle was performed after activation treatment, $Q_{24d}$ indicates the capacity during $19^{th}$ discharge cycle after activation treatment, and $100(Q_{24d}/Q_{5d})$ % indicates the retention rate (cycle characteristics) of the discharge capacity during $19^{th}$ charge-and-discharge cycle after activation treatment.

TABLE 4

| | $Q_{5c}$/ (mAh/g) | $Q_{5d}$/ (mAh/g) | $Q_{14d}$/ (mAh/g) | $100(Q_{14d}/Q_{5d})$% |
|---|---|---|---|---|
| Example 1 | 300 | 277 | 266 | 95.8 |
| Example 2 | 302 | 274 | 268 | 97.8 |
| Comparative Example 1 | 293 | 257 | 238 | 92.7 |

TABLE 5

| | $Q_{5c}$/ (mAh/g) | $Q_{5d}$/ (mAh/g) | $Q_{24d}$/ (mAh/g) | $100(Q_{24d}/Q_{5d})$% |
|---|---|---|---|---|
| Example 3 | 273 | 253 | 241 | 95.2 |
| Example 4 | 244 | 234 | 235 | 100.4 |
| Comparative Example 2 | 270 | 259 | 238 | 91.9 |
| Comparative Example 3 | 270 | 259 | 238 | 91.9 |

Evaluation of Rate Characteristics

After stepwise charging treatment for obtaining activated specimens was performed, the rate characteristics evaluation test was shifted to a cycle degradation test. The test was started with charging, and a charge-discharge cycle was performed by increasing the charge capacity in the order of 80, 120, 160, and 200 mAh/g within the potential range of 2.0-4.8 V at a test temperature of 30° C. and at a current density of 40 mA/g. At the $5^{th}$ cycle, activation treatment was performed by constant current-constant voltage charge (the cutoff current at 4.8 V is 10 mA/g) until 4 8 V. This stepwise charging activation treatment is essential in evaluation of the rate characteristics of the lithium-manganese composite oxide according to the present invention. In particular, this treatment is an essential process for a composite containing Fe. Subsequently, after activation treatment, the specimens of Examples 3 and 4, and Comparative Examples 2 and 3 were subjected to constant-current discharge at 40 mA/g, 600 mA/g, 1200 mA/g, and 2400 mA/g (charging was all performed at 40 mA/g) within the range of 2.0-4.8 V; and evaluation was performed, thereby evaluating the rate characteristics. FIGS. 8 and 12, and Table 6 illustrate the results. FIG. 8 illustrates the discharge curves of constant-current discharge at 40 mA/g, 600 mA/g, and 1200 mA/g.

TABLE 6

| | $Q_d$/(mAh/g) @ 40 mA/g | $Q_d$/(mAh/g) @ 600 mA/g | $Q_d$/(mAh/g) @ 1200 mA/g | $Q_d$/(mAh/g) @ 2400 mA/g |
|---|---|---|---|---|
| Example 3 | 248 | 194 | 152 | 75 |
| Example 4 | 249 | 199 | 171 | 98 |
| Comparative Example 2 | 237 | 183 | 122 | 51 |
| Comparative Example 3 | 253 | 176 | 110 | 45 |

As is clear from the Examples and Comparative Examples above, the lithium-manganese composite oxide according to the present invention was confirmed to be a substance that not only exhibits a high capacity, but is also excellent in long-term cycle characteristics and rate characteristics.

The invention claimed is:

1. A lithium-manganese composite oxide represented by formula (1): $Li_{1+x}[(Fe_yNi_{1-y})_zMn_{1-z}]_{1-x}O_2$ (1),
    wherein x, y, and z satisfy the following: $0<x\leq\frac{1}{3}$, $0\leq y<1$, and $0\leq z\leq 0.6$,
    the content ratio of Li to the total content of Fe, Ni, and Mn (Li/(Fe+Ni+Mn)) is 1.55 or less on a molar ratio basis,
    the content ratio of O to the total content of Fe, Ni, and Mn (O/(Fe+Ni+Mn)) is 2.48 or less on a molar ratio basis, and
    the lithium-manganese composite oxide comprises a crystalline phase having a layered rock-salt structure.

2. The lithium-manganese composite oxide according to claim 1, consisting of the crystalline phase having a layered rock-salt structure.

3. The lithium-manganese composite oxide according to claim 2, wherein $z\leq 0.25$, and the lithium-manganese composite oxide has a BET specific surface area of 12 m²/g or less.

4. The lithium-manganese composite oxide according to claim 2, wherein $z>0.25$, and the lithium-manganese composite oxide has a BET specific surface area of 16 m²/g or less.

5. The lithium-manganese composite oxide according to claim 1, wherein the lithium-manganese composite oxide has a spontaneous magnetization (Ms) of 0.007 emu/g or less (0.007 A·m²/kg or less).

6. The lithium-manganese composite oxide according to claim 5, wherein $z\leq 0.25$, and the lithium-manganese composite oxide has a BET specific surface area of 12 m²/g or less.

7. The lithium-manganese composite oxide according to claim 1, wherein the lithium-manganese composite oxide has a BET specific surface area of 12 m²/g or less.

8. The lithium-manganese composite oxide according to claim 5, wherein the total transition metal content per compositional formula ($g_{total}$) is 0.7 or more.

9. The lithium-manganese composite oxide according to claim 8, wherein the average transition metal content in a Li layer ($g_{MLi}$) is 0.01 or more.

10. The lithium-manganese composite oxide according to claim 7, wherein the average transition metal content in a Li layer ($g_{MLi}$) is 0.01 or more.

11. The lithium-manganese composite oxide according to claim 1, wherein $z>0.25$, and the lithium-manganese composite oxide has a BET specific surface area of 16 m²/g or less.

12. The lithium-manganese composite oxide according to claim 11, wherein the total transition metal content per compositional formula ($g_{total}$) is 0.74 or more.

13. The lithium-manganese composite oxide according to claim 11, wherein the average transition metal content in a Li layer ($g_{MLi}$) is 0.025 or more.

14. The lithium-manganese composite oxide according to claim 1, wherein $z\leq 0.25$, and the lithium-manganese composite oxide has a BET specific surface area of 12 m²/g or less.

15. A method for producing the lithium-manganese composite oxide of claim 1, the method comprising in the following sequence the steps of:
    (1) making a mixture of a manganese compound and at least one compound selected from the group consisting of a nickel compound and an iron compound into an alkaline mixture to form a precipitate,
    (2) subjecting the precipitate obtained in step (1) to wet oxidation treatment to allow the precipitate to age,
    (3) heating the aged precipitate obtained in step (2) together with a lithium compound, and
    (4) heating a mixture obtained in step (3) in the presence of an organic reducing agent in an inert atmosphere or in a reducing atmosphere.

16. A positive electrode material for lithium-ion secondary batteries, comprising the lithium-manganese composite oxide of claim 1.

17. A lithium-ion secondary battery comprising the positive electrode material for lithium-ion secondary batteries of claim 12.

* * * * *